(12) United States Patent
Krishna Mohan et al.

(10) Patent No.: US 12,240,700 B2
(45) Date of Patent: Mar. 4, 2025

(54) SYSTEM AND METHOD FOR CONSOLIDATING ITEMS FOR FULFILMENT OF ORDER IN WAREHOUSE

(71) Applicant: Addverb Technologies Limited, Noida (IN)

(72) Inventors: K. V. N. B. Sai Krishna Mohan, Noida (IN); Deolin Devasia Thomas, Noida (IN); Meghan Kamath, Noida (IN); Ravi Ranjan, Noida (IN); Sriram Sridhar, Noida (IN)

(73) Assignee: Addverb Technologies Limited, Noida (IN)

( * ) Notice: Subject to any disclaimer, the term of this patent is extended or adjusted under 35 U.S.C. 154(b) by 684 days.

(21) Appl. No.: 17/569,554

(22) Filed: Jan. 6, 2022

(65) Prior Publication Data

US 2023/0033636 A1    Feb. 2, 2023

(30) Foreign Application Priority Data

Jul. 31, 2021   (IN) .............................. 202111034594

(51) Int. Cl.
*B65G 1/137* (2006.01)
*B25J 9/16* (2006.01)
*B65G 1/06* (2006.01)

(52) U.S. Cl.
CPC ......... *B65G 1/1373* (2013.01); *B25J 9/1669* (2013.01); *B65G 1/06* (2013.01); *B65G 1/1371* (2013.01); *B65G 2201/0258* (2013.01)

(58) Field of Classification Search
CPC ...... B65G 1/1373; B65G 1/06; B65G 1/1371; B65G 2201/0258; B25J 9/1669
See application file for complete search history.

(56) References Cited

U.S. PATENT DOCUMENTS

| | | | |
|---|---|---|---|
| 6,289,260 B1 * | 9/2001 | Bradley | B65G 1/1376 414/280 |
| 7,331,471 B1 * | 2/2008 | Shakes | B07C 7/005 209/559 |
| 8,718,814 B1 * | 5/2014 | Clark | G06Q 10/08 700/214 |
| 9,914,586 B2 | 3/2018 | Zhu et al. | |

(Continued)

FOREIGN PATENT DOCUMENTS

WO   WO-2019061847 A1   4/2019

*Primary Examiner* — Kyle O Logan
(74) *Attorney, Agent, or Firm* — Bradley Arant Boult Cummings

(57) ABSTRACT

A system and method for managing items for fulfilment of an order in a warehouse are provided. The method comprises retrieving, at one instance, at least one item of the one or more items associated with an order being processed; scanning the items to generate a scan information therefor; assigning one of storage bins of a plurality of storage bins to the order being processed based on the acquired scan information; one of one or more sorting robots, provided on one or more platform levels to collect the said at least one item and transfer the said at least one item to the assigned storage bin to the order being processed; and transferring the said assigned storage bin to a packaging station in the warehouse, when each of the one or more items associated with the order being processed are transferred to the said assigned storage bin.

20 Claims, 11 Drawing Sheets

(56) References Cited

U.S. PATENT DOCUMENTS

| | | | |
|---|---|---|---|
| 9,975,148 B2 | 5/2018 | Zhu et al. | |
| 10,216,193 B2 | 2/2019 | Gupta et al. | |
| 10,245,620 B2 | 4/2019 | Xu et al. | |
| 10,248,112 B2 | 4/2019 | Zhu et al. | |
| 10,421,186 B2 | 9/2019 | Ma et al. | |
| 10,438,034 B2* | 10/2019 | Wagner | B65G 25/04 |
| 10,481,612 B2 | 11/2019 | Gupta et al. | |
| 10,732,644 B2 | 8/2020 | Mithal et al. | |
| 10,968,087 B2 | 4/2021 | Zhu et al. | |
| 11,029,701 B2 | 6/2021 | Gupta et al. | |
| 11,052,539 B2 | 7/2021 | Liu | |
| 11,192,720 B2* | 12/2021 | Lisso | B65G 1/1376 |
| 2007/0150383 A1* | 6/2007 | Shakes | G06Q 10/0875 |
| | | | 705/29 |
| 2012/0101627 A1* | 4/2012 | Lert | B65G 1/1378 |
| | | | 700/216 |
| 2016/0176637 A1* | 6/2016 | Ackerman | G06Q 10/087 |
| | | | 700/215 |
| 2020/0346348 A1 | 11/2020 | Zhu et al. | |
| 2021/0027236 A1* | 1/2021 | Elazary | B25J 9/1687 |
| 2021/0182772 A1* | 6/2021 | Jeswani | G06Q 10/087 |
| 2021/0188606 A1 | 6/2021 | Zhu et al. | |
| 2022/0398528 A1* | 12/2022 | Gupta | G06Q 10/063 |
| 2023/0033636 A1* | 2/2023 | Krishna Mohan | B65G 1/06 |
| 2023/0271785 A1* | 8/2023 | Gravelle | B65G 1/0492 |
| 2024/0199333 A1* | 6/2024 | Zizka | B65G 1/1373 |

* cited by examiner

SYSTEM AND METHOD FOR CONSOLIDATING ITEMS FOR FULFILMENT OF ORDER IN WAREHOUSE

FIELD OF THE PRESENT DISCLOSURE

The present disclosure generally relates to warehouse management and particularly to managing orders in an order fulfilment centre; and more specifically, to systems and methods for consolidating orders for fulfilment of an order in a warehouse.

BACKGROUND

Warehouses, also known as order fulfilment centres or distribution centres, are buildings or regions where inventory is stored and used to fulfil orders for customers. A typical warehouse that stores products may store hundreds if not thousands of different types of products. The warehouse generally includes a series of storage racks. Each rack may include multiple shelves arranged at different storage levels and adapted to store items therein. Generally, the items stored on the storage racks are contained in carriers, for example, storage containers such as trays, totes, or shipping cases. These storage racks, and thereby the items stored therein, are accessible by transport devices such as, for example, human operators, forklifts, shuttles/carts, and lifts/elevators that are movable within aisles between or along the storage racks or by other lifting and transporting devices. These transport devices may be automated or manually driven. Various items are received in a warehouse, to be temporarily stored therein, and are shipped from there to respective locations for fulfilment of the order.

Customers, such as retailers, may place orders by various modes such as by e-commerce websites, telephone, mail, and the like. A single order may demand multiple items, including different types of products. Multiple items as part of a single order may need to be grouped together for efficient delivery. With those grouped multiple items having increased varieties (types) of products, grouping those together becomes challenging. These different types of products may need to be picked from multiple racks and then consolidated as per the order. There have been automation systems introduced for automatic picking of items from the storage racks as per the order, thereby reducing the manual effort involved therein. However, traditionally, consolidation of orders is still, for most part, is done manually, wherein operators would have to collect boxes of orders with material in it, sort those out based on the order being processed, and transport it for further activities for hours together. This has been a highly labour-intensive job which results in economic losses in light of rising cost of labour, and further raises a question on ergonomics as well as productivity.

To operate a warehouse efficiently, it should be run with a high "throughput." The warehouse throughput is defined as the volume of inventory or number of orders fulfilled in a given unit of time. The enterprise running the warehouse attempts to fulfil as many orders as possible in the shortest amount of time. Since, as discussed, a single order may demand different types of products, it may be time-consuming to pick and then consolidate multiple items related to a single order, or multiple orders at the same time, if the manual processes of sorting and consolidation of items related to an order are employed.

Therefore, in light of the foregoing discussion, there exists a need to overcome problems associated with conventional systems and methods for consolidation of items for fulfilment of an order in a warehouse, so as to have maximum throughput possible considering the design and configuration of the warehouse.

SUMMARY

In an aspect, a warehouse execution system for consolidating items for fulfilment of orders in a warehouse is provided. The warehouse execution system comprises an item retrieval arrangement configured to retrieve items associated with one or more orders from a storage area in the warehouse and place the retrieved items at a conveyor arrangement to be transferred to one or more infeed stations in the warehouse. The warehouse execution system further comprises a scanning unit provided at each of the one or more infeed stations, the scanning unit configured to be implemented for scanning the items received thereat to generate a scan information therefor. The warehouse execution system further comprises an item transfer arrangement having a plurality of storage bins, the item transfer arrangement configured to transfer the storage bins of the plurality of storage bins to a packaging station in the warehouse. The warehouse execution system further comprises one or more platform levels with the one or more infeed stations located adjacent to one side thereof and the item transfer arrangement located adjacent to other side thereof. The warehouse execution system further comprises one or more sorting robots provided on each of the one or more platform levels, the one or more sorting robots configured to travel on the platform level underneath thereof to transfer the items from the one or more infeed stations to one of the storage bins of the plurality of storage bins in the item transfer arrangement. The warehouse execution system further comprises a controller. The controller is configured to: execute a command for an order being processed with information about one or more items associated therewith, implement the item retrieval arrangement to retrieve, at one instance, at least one item of the one or more items associated with the order being processed and implement the conveyor arrangement to transfer the retrieved at least one item to one of the one or more infeed stations, in response to the executed command, acquire, from the scanning unit, the scan information for the said at least one item received at corresponding one of the one or more infeed stations, assign one of the storage bins of the plurality of storage bins at the item transfer arrangement to the order being processed based on the acquired scan information, implement one of the one or more sorting robots to collect the said at least one item from the said one of the one or more infeed stations and transfer the said at least one item to the assigned storage bin to the order being processed, and implement the item transfer arrangement to transfer the said assigned storage bin to the packaging station, when each of the one or more items associated with the order being processed are transferred to the said assigned storage bin.

In one or more embodiments, the item transfer arrangement comprises one or more buffer lines arranged at one or more transfer levels corresponding to the one or more platform levels with each of the one or more buffer lines having one or more of the plurality of storage bins placed thereon, such that the one or more sorting robots transfer the items to the buffer lines at the transfer level corresponding to the underneath platform level.

In one or more embodiments, at least two buffer lines are arranged at each of the one or more transfer levels, and wherein the item transfer arrangement further comprises at least one shuttle arranged intermediate and associated with each of the at least two buffer lines and configured to pick the said assigned storage bin from each of the at least two buffer lines to be transferred to the packaging station.

In one or more embodiments, the item transfer arrangement further comprises one or more out-bound conveyors arranged at the one or more transfer levels and configured to receive the said assigned storage bin from the at least one shuttle of the corresponding transfer level at respective first ends thereof and transfer the said assigned storage bin to the packaging station at a respective second end thereof; and one or more in-bound conveyors arranged at the one or more transfer levels and configured to receive one or more empty storage bins from the packaging station at respective first end thereof and transfer the received empty storage bins to respective second end thereof to be picked by the at least one shuttle of the corresponding transfer level.

In one or more embodiments, the at least one shuttle is further configured to pick the one or more empty storage bins from the in-bound conveyor of the corresponding transfer level from the second end thereof and transfer the picked one or more empty storage bins to one of the associated at least two buffer lines.

In one or more embodiments, the warehouse execution system further comprises a robotic manipulator provided at each of the one or more infeed stations, the robotic manipulator configured to: pick the item received at corresponding one of the one or more infeed stations; manipulate the item to allow for scanning thereof by the scanning unit; and drop the item to the said one of the one or more sorting robots.

In one or more embodiments, the controller is further configured to execute the command for the order being processed based on availability of one or more of: the item retrieval arrangement, the one or more infeed stations, the one or more sorting robots and the item transfer arrangement, for respective processing of the said at least one item associated with the order being processed.

In one or more embodiments, the controller is further configured to implement the conveyor arrangement to transfer the retrieved at least one item to one of the one or more infeed stations based on availability thereof for processing of the at least one item associated with the order being processed.

In one or more embodiments, the controller is further configured to implement one of the one or more sorting robots, available to receive the said at least item thereon, to be positioned at the corresponding platform level adjacent to one of the one or more infeed stations to receive the item thereon in a distributed manner.

In another aspect, a method for consolidating items for fulfilment of orders in a warehouse is provided. The method comprises executing a command for an order being processed with information about one or more items associated therewith. The method further comprises implementing an item retrieval arrangement to retrieve, at one instance, at least one item of the one or more items associated with the order being processed and implement the conveyor arrangement to transfer the retrieved at least one item to an infeed station in the warehouse, in response to the executed command. The method further comprises implementing a scanning unit provided at each of the one or more infeed stations, for scanning the items received thereat to generate a scan information therefor. The method further comprises assigning one of storage bins of a plurality of storage bins at an item transfer arrangement to the order being processed based on the acquired scan information. The method further comprises implementing one of one or more sorting robots, provided on one or more platform levels with the one or more infeed stations located adjacent to one side thereof and the item transfer arrangement located adjacent to other side thereof, to collect the said at least one item from the said one of the one or more infeed stations and transfer the said at least one item to the assigned storage bin to the order being processed. The method further comprises implementing the item transfer arrangement to transfer the said assigned storage bin to a packaging station in the warehouse, when each of the one or more items associated with the order being processed are transferred to the said assigned storage bin.

In one or more embodiments, the method comprises providing one or more buffer lines arranged at one or more transfer levels corresponding to the one or more platform levels with each of the one or more buffer lines having one or more of the plurality of storage bins placed thereon, such that the one or more sorting robots transfer the items to the buffer lines at the transfer level corresponding to the underneath platform level.

In one or more embodiments, the method comprises providing at least two buffer lines arranged at each of the one or more transfer levels, and at least one shuttle arranged intermediate and associated with each of the at least two buffer lines to pick the said assigned storage bin from one of the at least two buffer lines to be transferred to the packaging station.

In one or more embodiments, the method comprises providing one or more out-bound conveyors arranged at the one or more transfer levels and configured to receive the said assigned storage bin from the at least one shuttle of the corresponding transfer level at respective first ends thereof and transfer the said assigned storage bin to the packaging station at a respective second end thereof; and providing one or more in-bound conveyors arranged at the one or more transfer levels and configured to receive one or more empty storage bins from the packaging station at respective first end thereof and transfer the received empty storage bins to respective second end thereof to be picked by the at least one shuttle of the corresponding transfer level.

In one or more embodiments, the method comprises implementing the at least one shuttle to pick the one or more empty storage bins from the in-bound conveyor of the corresponding transfer level from the second end thereof and transfer the picked one or more empty storage bins to one of the associated at least two buffer lines.

In one or more embodiments, the method comprises providing a robotic manipulator at each of the one or more infeed stations, and implementing the robotic manipulator to: pick the item received at corresponding one of the one or more infeed stations; manipulate the item to allow for scanning thereof by the scanning unit; and drop the item to the said one of the one or more sorting robots.

In one or more embodiments, the method comprises executing the command for the order being processed based on availability of one or more of: the item retrieval arrangement, the one or more infeed stations, the one or more sorting robots and the item transfer arrangement, for respective processing of the said at least one item associated with the order being processed.

In one or more embodiments, the method comprises implementing the conveyor arrangement to transfer the retrieved at least one item to one of the one or more infeed stations based on availability thereof for processing of the at least one item associated with the order being processed.

In one or more embodiments, the method comprises implementing one of the one or more sorting robots, available to receive the item thereon, to be positioned at the corresponding platform level adjacent to one of the one or more infeed stations to receive the item thereon in a distributed manner.

In yet another aspect, a computer program product comprising at least one non-transitory computer-readable storage medium having computer-executable program code instructions stored therein is provided. Herein, the computer-executable program code instructions comprise program code instructions to: execute a command for an order being processed with information about one or more items associated therewith; implement an item retrieval arrangement to retrieve, at one instance, at least one item of the one or more items associated with the order being processed and implement the conveyor arrangement to transfer the retrieved at least one item to one of one or more infeed stations in the warehouse, in response to the executed command; implement a scanning unit provided at each of the one or more infeed stations, for scanning the items received thereat to generate a scan information therefor; assign one of storage bins of a plurality of storage bins at an item transfer arrangement to the order being processed based on the acquired scan information; implement one of one or more sorting robots, provided on one or more platform levels with the one or more infeed stations located adjacent to one side thereof and the item transfer arrangement located adjacent to other side thereof, to collect the said at least one item from the said one of the one or more infeed stations and transfer the said at least one item to the assigned storage bin to the order being processed; and implement the item transfer arrangement to transfer the said assigned storage bin to a packaging station in the warehouse, when each of the one or more items associated with the order being processed are transferred to the said assigned storage bin.

In one or more embodiments, the computer-executable program code instructions further comprise program code instructions to: execute the command for the order being processed based on availability of one or more of: the item retrieval arrangement, the one or more infeed stations, the one or more sorting robots and the item transfer arrangement, for respective processing of the said at least one item associated with the order being processed; implement the conveyor arrangement to transfer the retrieved at least one item to one of the one or more infeed stations based on availability thereof for processing of the at least one item associated with the order being processed; and implement one of the one or more sorting robots, available to receive the item thereon, to be positioned at the corresponding platform level adjacent to one of the one or more infeed stations to receive the item thereon in a distributed manner.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

Figure 1:
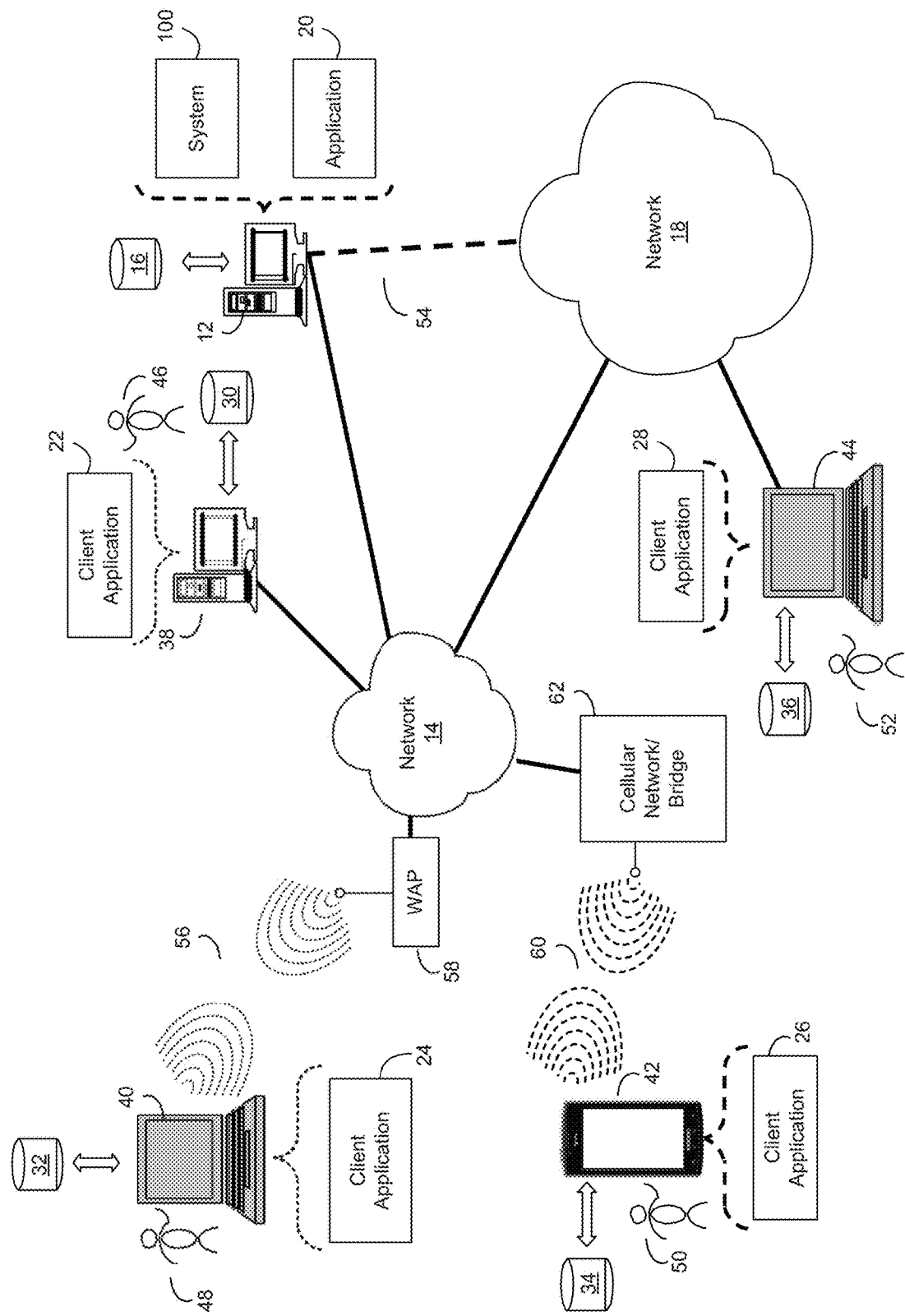
FIG. 1 illustrates a schematic of a system that may reside on and may be executed by a computer, which may be connected to a network, in accordance with one or more exemplary embodiments of the present disclosure.

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Some portions of the detailed description that follows are presented and discussed in terms of a process or method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fibre cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. In present implementations, the used language for training may be one of Python, Tensorflow™ Bazel, C, C++. Further, decoder in user device (as will be discussed) may use C, C++ or any processor specific ISA. Furthermore, assembly code inside C/C++ may be utilized for specific operation. Also, ASR (automatic speech recognition) and G2P decoder along with entire user system can be run in embedded Linux (any distribution), Android, iOS, Windows, or the like, without any limitations. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function (s)/act(s). These computer program instructions may be provided to a processor of a general-purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown a system 100 that may reside on and may be executed by a computer (e.g., computer 12), which may be connected to a network (e.g., network 14) (e.g., the internet or a local area network). Examples of computer 12 may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, a portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, the instruction sets and subroutines of system 100, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random-access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, system 100 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute application 20 for management of a warehouse and specifically for consolidating items for fulfilment of an order in the warehouse. In some implementations, system 100 and/or application 20 may be accessed via one or more of client applications 22, 24, 26, 28. In some implementations, system 100 may be a standalone application, or may be an applet/application/script/extension that may interact with and/or be executed within application 20, a component of application 20, and/or one or more of client applications 22, 24, 26, 28. In some implementations, application 20 may be a standalone application, or may be an applet/application/ script/extension that may interact with and/or be executed within system 100, a component of system 100, and/or one or more of client applications 22, 24, 26, 28. In some implementations, one or more of client applications 22, 24, 26, 28 may be a standalone application, or may be an applet/application/script/extension that may interact with and/or be executed within and/or be a component of system 100 and/or application 20. Examples of client applications 22, 24, 26, 28 may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to user devices 38, 40, 42, 44, may be executed by one or more processors and one or more memory architectures incorporated into user devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of user devices 38, 40, 42, 44 (and/or computer 12) may include, but are not limited to, a personal computer (e.g., user device 38), a laptop computer (e.g., user device 40), a smart/data-enabled, cellular phone (e.g., user device 42), a notebook computer (e.g., user device 44), a tablet (not shown), a server (not shown), a television (not shown), a smart television (not shown), a media (e.g., video, photo, etc.) capturing device (not shown), and a dedicated network device (not shown). User devices 38, 40, 42, 44 may each execute an operating system, examples of which may include but are not limited to, Android®, Apple® iOS®, Mac® OS X®; Red Hat® Linux®, or a custom operating system.

In some implementations, one or more of client applications 22, 24, 26, 28 may be configured to effectuate some or all of the functionality of system 100 (and vice versa). Accordingly, in some implementations, system 100 may be a purely server-side application, a purely client-side application, or a hybrid server-side/client-side application that is cooperatively executed by one or more of client applications 22, 24, 26, 28 and/or system 100.

In some implementations, one or more of client applications 22, 24, 26, 28 may be configured to effectuate some or all of the functionality of application 20 (and vice versa). Accordingly, in some implementations, application 20 may be a purely server-side application, a purely client-side application, or a hybrid server-side/client-side application that is cooperatively executed by one or more of client applications 22, 24, 26, 28 and/or application 20. As one or more of client applications 22, 24, 26, 28, system 100, and application 20, taken singly or in any combination, may effectuate some or all of the same functionality, any description of effectuating such functionality via one or more of client applications 22, 24, 26, 28, system 100, application 20, or combination thereof, and any described interaction(s) between one or more of client applications 22, 24, 26, 28, system 100, application 20, or combination thereof to effectuate such functionality, should be taken as an example only and not to limit the scope of the disclosure.

In some implementations, one or more of users 46, 48, 50, 52 may access computer 12 and system 100 (e.g., using one or more of user devices 38, 40, 42, 44) directly through network 14 or through secondary network 18. Further, computer 12 may be connected to network 14 through secondary network 18, as illustrated with phantom link line 54. System 100 may include one or more user interfaces, such as browsers and textual or graphical user interfaces, through which users 46, 48, 50, 52 may access system 100.

In some implementations, the various user devices may be directly or indirectly coupled to network 14 (or network 18). For example, user device 38 is shown directly coupled to network 14 via a hardwired network connection. Further, user device 44 is shown directly coupled to network 18 via a hardwired network connection. User device 40 is shown wirelessly coupled to network 14 via wireless communication channel 56 established between user device 40 and wireless access point (i.e., WAP) 58, which is shown directly coupled to network 14. WAP 58 may be, for example, an IEEE 802.11a, 802.11b, 802.11g, Wi-Fi®, RFID, and/or Bluetooth™ (including Bluetooth™ Low Energy) device that is capable of establishing wireless communication channel 56 between user device 40 and WAP 58. User device 42 is shown wirelessly coupled to network 14 via wireless communication channel 60 established between user device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example, Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
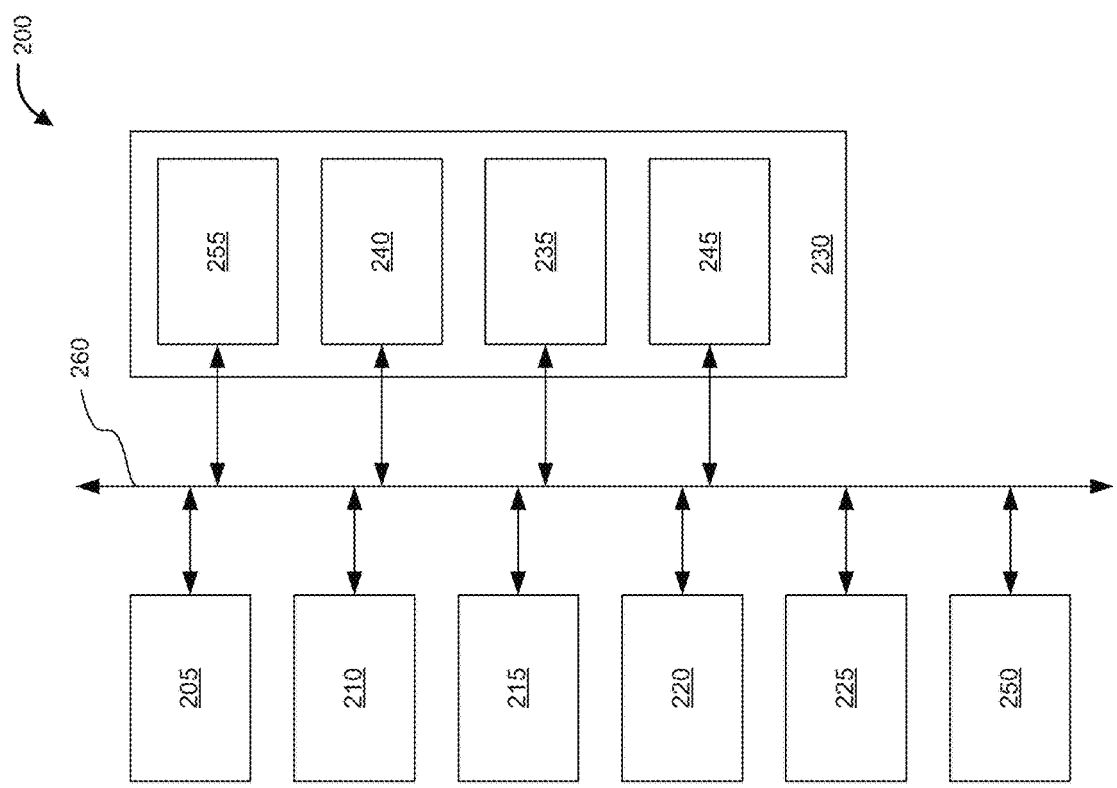
FIG. 2 illustrates a schematic of a server device, in accordance with one or more exemplary embodiments of the present disclosure.

The system 100 may include a computing system 200 (in the form of a controller 200, as shown in FIG. 2) for warehouse management and for managing items for fulfilment of an order in the warehouse by issuing commands (as will be described later in more detail). Herein, FIG. 2 is a block diagram of an example of the controller 200 capable of implementing embodiments according to the present disclosure. In one embodiment, an application server as described herein may be implemented on exemplary controller 200. In the example of FIG. 2, the controller 200 includes a processing unit 205 (hereinafter, referred to as CPU 205) for running software applications (such as, the application 20 of FIG. 1) and optionally an operating system. Memory 210 stores applications and data for use by the CPU 205. Storage 215 provides non-volatile storage for applications and data and may include fixed disk drives, removable disk drives, flash memory devices, and CD-ROM, DVD-ROM or other optical storage devices. An optional user input device 220 includes devices that communicate user inputs from one or more users to the controller 200 and may include keyboards, mice, joysticks, touch screens, etc. A communication or network interface 225 is provided which allows the controller 200 to communicate with other computer systems via an electronic communications network, including wired and/or wireless communication and including an Intranet or the Internet. In one embodiment, the controller 200 receives instructions and user inputs from a remote computer through communication interface 225. Communication interface 225 can comprise a transmitter and receiver for communicating with remote devices. An optional display device 250 may be provided which can be any device capable of displaying visual information in response to a signal from the controller 200. The components of the controller 200, including the CPU 205, memory 210, data storage 215, user input devices 220, communication interface 225, and the display device 250, may be coupled via one or more data buses 260.

In the embodiment of FIG. 2, a graphics system 230 may be coupled with the data bus 260 and the components of the controller 200. The graphics system 230 may include a physical graphics processing unit (GPU) 235 and graphics memory. The GPU 235 generates pixel data for output images from rendering commands. The physical GPU 235 can be configured as multiple virtual GPUs that may be used in parallel (concurrently) by a number of applications or processes executing in parallel. For example, mass scaling processes for rigid bodies or a variety of constraint solving processes may be run in parallel on the multiple virtual GPUs. Graphics memory may include a display memory 240 (e.g., a framebuffer) used for storing pixel data for each pixel of an output image. In another embodiment, the display memory 240 and/or additional memory 245 may be part of the memory 210 and may be shared with the CPU 205. Alternatively, the display memory 240 and/or additional memory 245 can be one or more separate memories provided for the exclusive use of the graphics system 230. In another embodiment, graphics system 230 includes one or more additional physical GPUs 255, similar to the GPU 235. Each additional GPU 255 may be adapted to operate in parallel with the GPU 235. Each additional GPU 255 generates pixel data for output images from rendering commands. Each additional physical GPU 255 can be configured as multiple virtual GPUs that may be used in parallel (concurrently) by a number of applications or processes executing in parallel, e.g., processes that solve constraints. Each additional GPU 255 can operate in conjunction with the GPU 235, for example, to simultaneously generate pixel data for different portions of an output image, or to simultaneously generate pixel data for different output images. Each additional GPU 255 can be located on the same circuit board as the GPU 235, sharing a connection with the GPU 235 to the data bus 260, or each additional GPU 255 can be located on another circuit board separately coupled with the data bus 260. Each additional GPU 255 can also be integrated into the same module or chip package as the GPU 235. Each additional GPU 255 can have additional memory, similar to the display memory 240 and additional memory 245, or can share the memories 240 and 245 with the GPU 235. It is to be understood that the circuits and/or functionality of GPU as described herein could also be implemented in other types of processors, such as general-purpose or other special-purpose coprocessors, or within a CPU.

Figure 3:
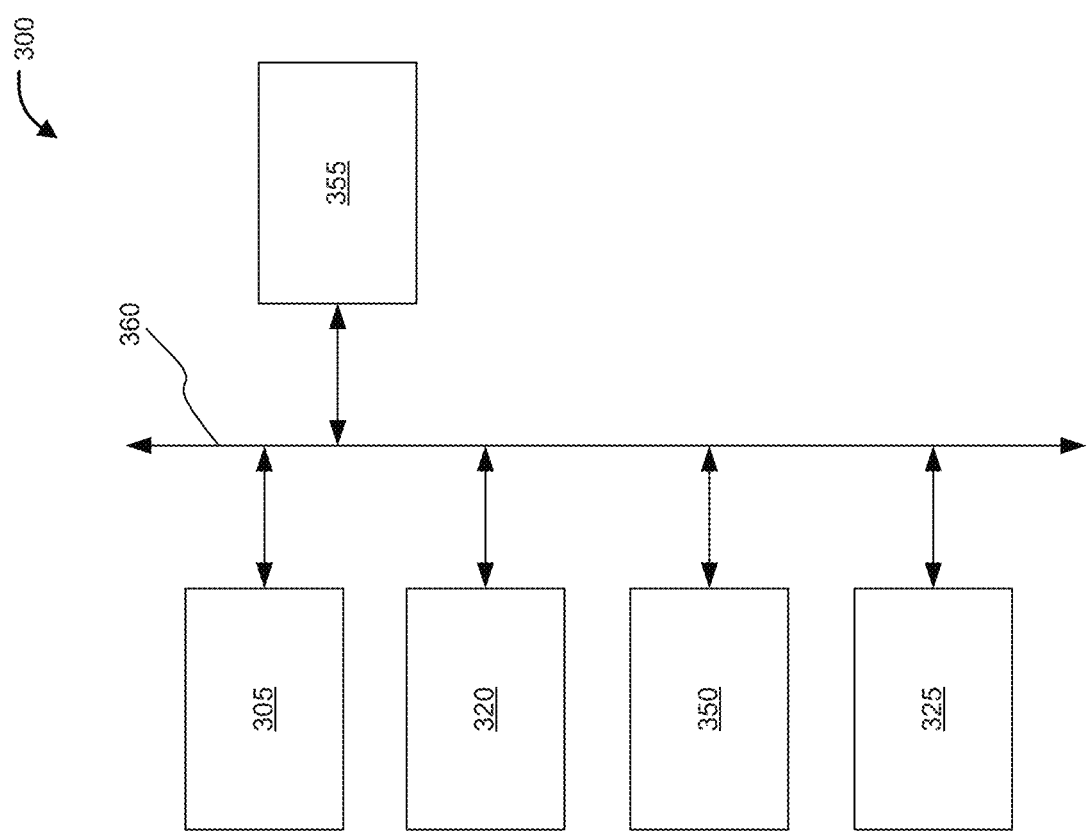
FIG. 3 illustrates a schematic of a client device, in accordance with one or more exemplary embodiments of the present disclosure.

The system 100 may also include an end user or a client device 300 (as shown in FIG. 3). In embodiments of the present disclosure, the client device 300 may embody a scanning unit (as will be discussed later). Herein, FIG. 3 is a block diagram of an example of the scanning unit 300 capable of implementing embodiments according to the present disclosure. In the example of FIG. 3, the scanning system 300 includes a processor 305 (hereinafter, referred to as CPU 305) for running software applications (such as, the application 20 of FIG. 1) and optionally an operating system. A user input device 320 is provided with includes devices that communicate user inputs from one or more users and may include keyboards, mice, joysticks, touch screens, and/or microphones. Further, a communication interface 325 is provided which allows the scanning system 300 to communicate with other computer systems (e.g., the controller 200 of FIG. 2) via an electronic communications network, including wired and/or wireless communication and including the Internet. The scanning system 300 may also include a scanner 355 may be any device capable of scanning one or more of barcodes, QR codes, or any other form of codes. In other examples, the scanner 355 may be a Bluetooth™ enabled device without any limitations. In the present examples, the scanner 355 may be a ring scanner as known in the art and discussed later in the description. A display device 350 may be provided which may be any device capable of displaying visual information, including information received from the decoder 355. In particular, as will be described below, the display device 350 may be used to display visual information received from the controller 200 of FIG. 2. The components of the scanning system 300 may be coupled via one or more data buses 360.

It may be seen that compared to the controller 200 in the example of FIG. 2, the scanning system 300 in the example of FIG. 3 may have fewer components and less functionality and, as such, may be referred to as a user device or the like. However, the scanning system 300 may include other components including those described above. In general, the scanning system 300 may be any type of device that has display capability, the capability to decode (decompress) data, and the capability to receive inputs from a user and send such inputs to the controller 200. However, the scanning system 300 may have additional capabilities beyond those just mentioned.

Figure 4:
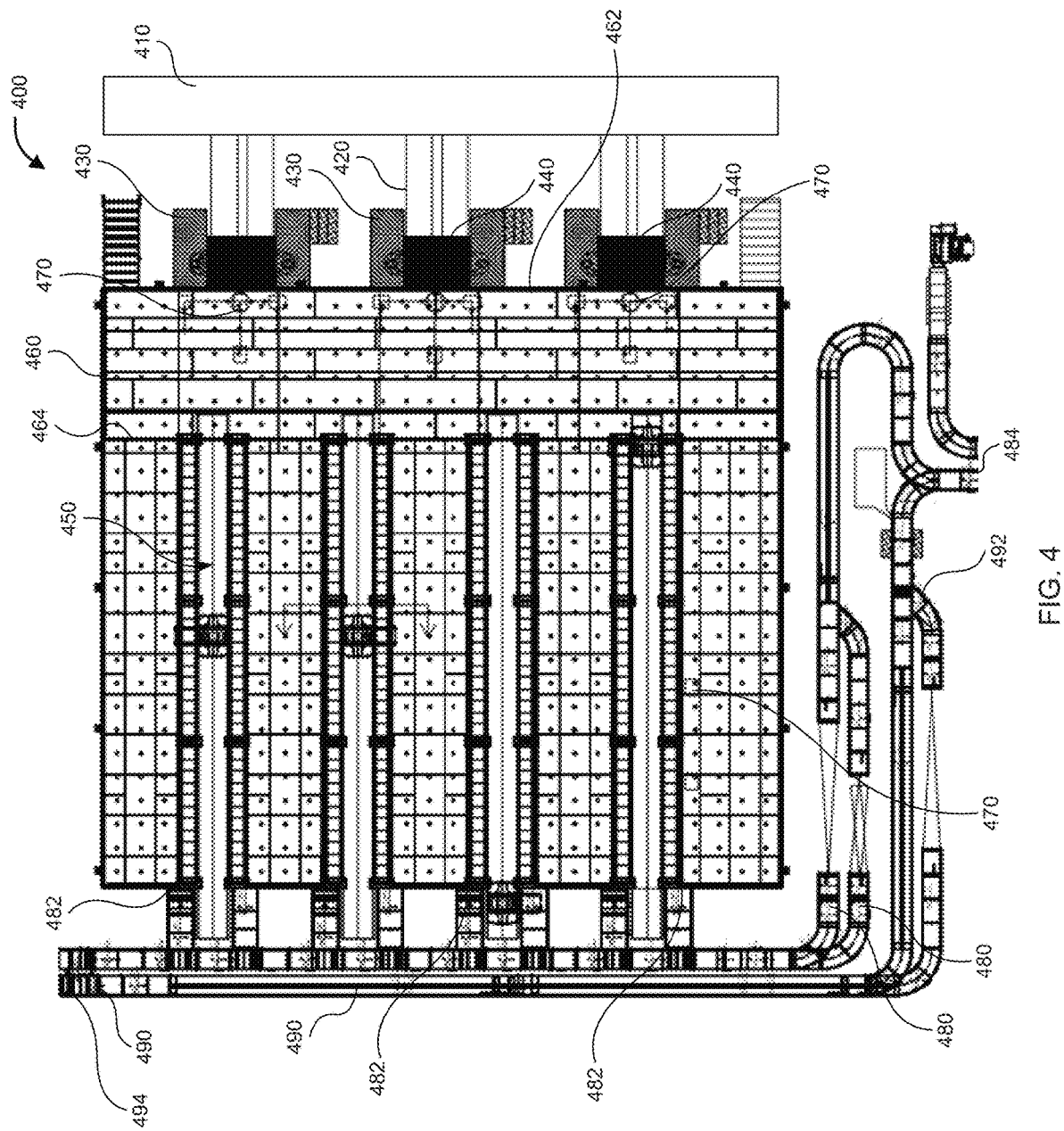
FIG. 4 illustrates a simplified top plan view illustration of a warehouse management system implemented in a warehouse, in accordance with one or more exemplary embodiments of the present disclosure.

Referring now to FIG. 4, illustrated is an exemplary simplified top plan view illustration of a warehouse execution system 400 implemented in a warehouse. As used herein, the warehouse may represent any location, structure or facility for storing items, and may generally be in the form of a building. For the purposes of the present disclosure, the terms "warehouse" and "warehouse execution system" have been interchangeably used hereinafter, with the term warehouse 400 being used to generally represent physical components and the warehouse execution system 400 being used to generally representing other components (sometimes, non-physical components) responsible for operations. Further, herein, the "items" may refer to any product, goods, merchandise, material, document, resource, etc. handled by warehouse. Non-limiting examples of "items" include mechanical parts, electronic components, electrical systems, building materials, industrial and/or commercial products/parts, chemicals, vehicles, machines, natural resources, pharmaceutical items, medical equipment, defence systems, computer devices, office supplies, furniture, food items, and articles of clothing. Warehouse may serve as an intermediary between item sources (e.g., manufactures of items) and item destinations (e.g., retailers or sellers of items). Warehouse may be associated with an enterprise which may include any business-related entity, such as a corporation, firm, partnership, sole proprietorship, conglomeration, etc. Items may include manufacturing parts, finished products, and service parts.

In the present embodiments, the warehouse execution system 400 may be implemented on a system (such as, the system 100 of FIG. 1); and the said terms "warehouse execution system 400" and "system 100" have been interchangeably used herein afterwards. For the purposes of the present disclosure, the warehouse execution system 400 may include one or more hardware, software, and/or firmware components for managing and executing activities associated with warehouse. The warehouse execution system 400 may be implemented in a supply chain infrastructure associated with enterprise. The warehouse execution system 400 may include one or more associated management components (e.g., computers, servers, handheld devices, RF devices, scanners, automated loading and unloading devices, packing devices, etc.) that collaboratively facilitate management and execution of warehouse activities. The warehouse execution system 400 may also include one or more software applications, such as enterprise software applications compatible with the application system provided by SAP® or the like, widely used in warehouse management.

In some examples, the warehouse execution system 400 may be implemented as a subsystem within, or integrated with, a broader business application associated with enterprise. For example, the warehouse execution system 400 may be implemented within or together with a Customer Relationships Management (CRM), Supply Chain Management (SCM) system, or Enterprise Resource Management (ERP) application. Although depicted as separate from warehouse, all or part of the warehouse execution system 400 may be located or dispersed within the warehouse. The warehouse execution system 400 may include logic for processing requests from one or more systems (such as, the controller 200) interacting with the warehouse execution system 400. Requestors may include purchasing systems, sales order systems, order fulfilment systems, CRM applications, etc. In one configuration, the warehouse execution system 400 may process Electronic Data Interchange (EDI) transactions. The warehouse execution system 400 may also interact with various systems using the Standard Generalized Markup Language (SGML), Extensible Markup Language (XML), Electronic Business XML (ebXML) and/or any other language that facilitates the creating and sharing of common information formats. The warehouse execution system 400 may additionally include and/or leverage one or more validation processes and languages, such as Tree Regular Expressions (TREX) and the like.

As generally illustrated in FIG. 4, the warehouse 400 includes an item retrieval arrangement 410, a conveyor arrangement 420, one or more infeed stations 430, a scanning unit 440 (similar to the scanning unit 300 of FIG. 3) provided at each of the one or more infeed stations 430, an item transfer arrangement 450, one or more platform levels 460 (only one level being visible in the illustration of FIG. 4), and one or more sorting robots 470 provided on each of the one or more platform levels 460. Further, as shown in FIG. 4, the item transfer arrangement 450 further includes one or more out-bound conveyors 480 and one or more in-bound conveyors 490. The various arrangements and components as described herein to be part of the warehouse 400 work in conjunction to achieve the objective of consolidating items for fulfilment of orders therein.

Figure 5:
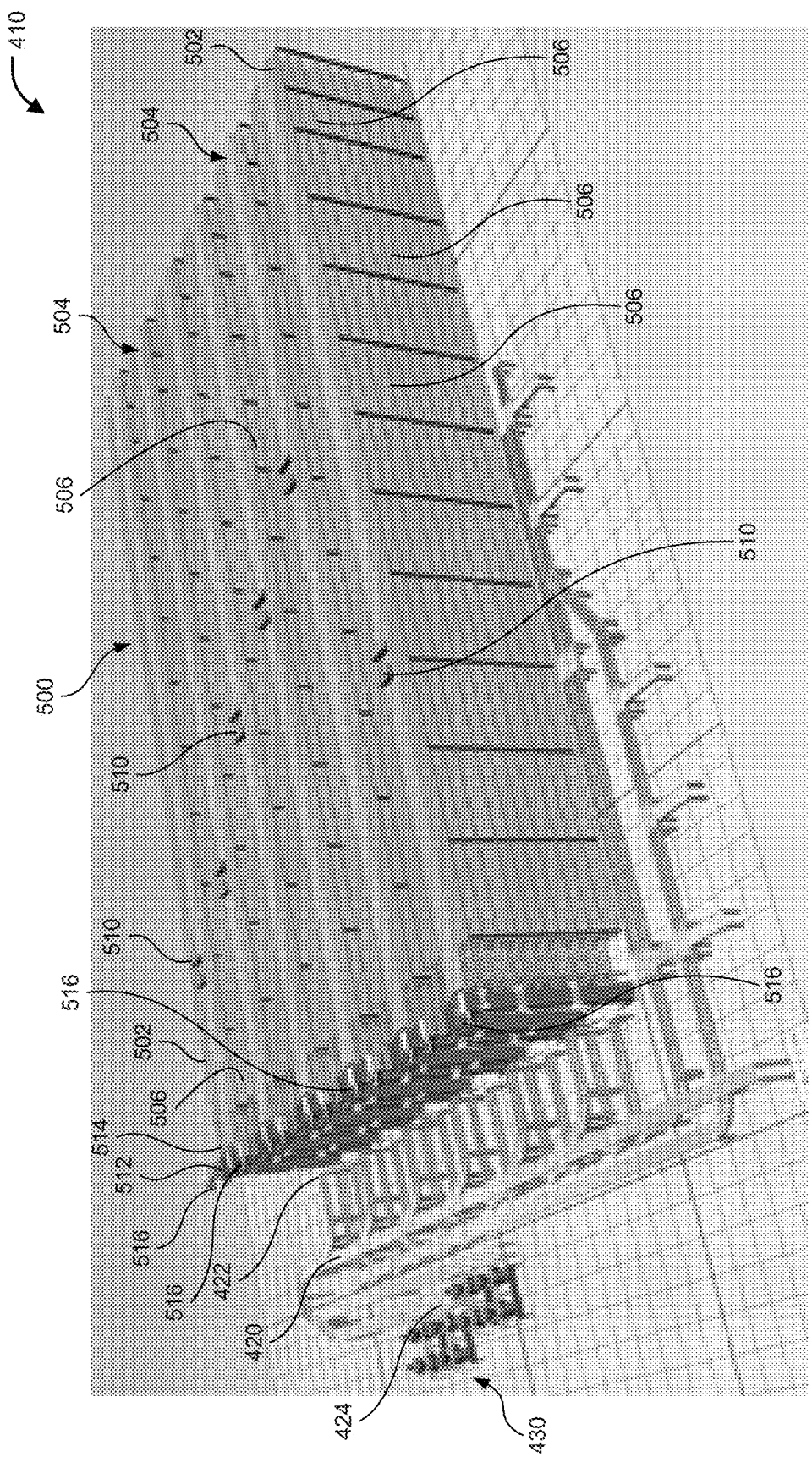
FIG. 5 illustrates a simplified diagrammatic illustration of a portion of the warehouse management system showing an item retrieval arrangement with a conveyor arrangement connecting the item retrieval arrangement to one or more infeed stations therein, in accordance with one or more exemplary embodiments of the present disclosure.

FIG. 5 illustrates a simplified diagrammatic illustration of a portion of the warehouse management system 400 showing the item retrieval arrangement 410 with the conveyor arrangement 420 connecting the item retrieval arrangement 410 to the one or more infeed stations 430 therein, in accordance with one or more exemplary embodiments of the present disclosure. As shown, the item retrieval arrangement 410 includes a storage area 500, in the form of a multi-level storage structure. The storage area 500 comprises a plurality of racks 502. As may be seen in FIG. 5, the plurality of racks 502 are arranged in spaced-apart rows which define a pair of racks 502 with an aisle therebetween, and each such aisle generally provides access to two opposing racks 502. Though in FIG. 5 reference is being made to one of pair of racks 502 and a corresponding aisle 504 therebetween, it can be appreciated that a plurality of rows of racks 502 and corresponding aisles 504 are contemplated in the item retrieval arrangement 410 (as shown in FIG. 5). The racks 502 may be in the form of a conventional case flow bay which includes multiple shelves 506. The shelves 506 are vertically spaced and are arranged at different storage levels.

In the item retrieval arrangement 410, the items are delivered by totes and are placed on the shelves 506 in the rack 502. Herein, totes are storage containers used to hold items for transportation in the warehouse 400. Hereinafter, the term "totes" and "items" have been generally interchangeably used. There may be several different sizes of totes. Additionally, some totes may be designed for holding frozen and refrigerated goods. Each tote may have an identifier to support automated movement through the warehouse 400 by, for instance, the conveyor arrangement 420. In an example, each tote may have a bar code identifier that can be scanned as it moves past various points in the warehouse 400. In this manner, a tote can be moved from a pallet to the rack 502 or other location with the warehouse 400, while its location can be easily tracked at all points of time.

As may further be seen in FIG. 5, the item retrieval arrangement 410 includes at least one shuttle 510 associated with one of the multiple shelves 506 from each rack 502 in the pair of racks 502 at the same corresponding storage level. The shuttle 510 is configured to move, generally, horizontally along the associated shelves 506 in the pair of racks 502 to store and retrieve items therefrom. The shuttle 510 is mobile in the horizontal direction along the shelves 506, and is implemented at each storage level between the pair of racks 502. The shuttle 510, whose detail is not shown in the drawing, is equipped with a running platform, which can contain a package on its mid-section; a pair of arms installed in the front and back of the running platform, which can extend in the horizontal direction perpendicular to the running direction of the platform towards either the left or right side of the platform; and fingers placed at each end of the arms, which can open and close (recede and extend). When the arms are extended towards either the left or right side with the fingers in the closed position, the package carried on the mid-section of the platform can be pushed out, thus the package can be placed on the shelf 506 at the same height level as the mid-section surface of the running platform. Conversely, when the arm is extended into the shelf 506 with the fingers in the open position, then, a finger is put into a closed position to hook the package, and finally, the arm is contracted, allowing the package to be retrieved onto the running platform.

Referring again to FIG. 5, as may be seen, the item retrieval arrangement 410 includes stations 512 located at one end of each of the shelves 506 in the plurality of racks 502. These stations 512 are equipped with station conveyors 514. The number of station conveyors 514 is the same as the number of storage levels of the shelves 506 in the racks 502. Each of the station conveyor 514 is placed so that its conveying surface is generally at the same height level as the shelf 506 of the corresponding storage level, within the racks 502. The direction of operation of the station conveyors 514 is predetermined to be along the front and back direction. A number of types and forms can be considered for the station conveyor 514. In the present examples, a roller conveyor that allows the package to be loaded on or off in the direction perpendicular to the direction of conveyance is implemented.

The item retrieval arrangement 410 further includes at least one lift 516 associated with each one of the plurality of racks 502. The lift 516 is configured to move, generally, vertically along the associated rack 502 between the different storage levels therein. The lift 516 is placed adjacent to the stations 512, on the side away from the layered shelves 506 of the racks 502. As may be contemplated by a person skilled in the art, the lift 516 generally includes a mast (not shown) placed in the space between the shipping and receiving stations 512, and platforms (not shown) located at the left and right sides of the mast, which can move up and down.

Further, as illustrated in FIG. 5, the warehouse 400 includes the conveyor arrangement 420. As may be seen, the conveyor arrangement 420 is associated with each of the plurality of racks 502. The conveyor arrangement 420 is adapted to receive (and transport) items for any of the racks 502 from the at least one lift 516 associated therewith. As shown, the warehouse 400, or specifically the conveyor arrangement 420 includes a system of conveyor belts which may be associated with scanners (such as, fixed barcode scanners), and hand-held scanners (such as, rings scanners) for automating both the order fulfilment (outbound) and inventory restocking (inbound) processes. In the present examples, the conveyor arrangement 420 may be managed by an Order Fulfilment Subsystem which in turn may be a part of the warehouse execution system 400.

For inbound scenario, the conveyor arrangement 420 moves a tote with one or more items to one of the lifts 516 (associated with the rack 502 in which the corresponding item is to be stored) to be picked thereby, which moves the tote to the desired storage level, where the tote is picked by the station conveyor 514, from which the tote is picked by the associated shuttle 510 at that storage level, to be moved to the specific bay of one of the shelves 506 in the pair of racks 502 associated therewith. For outbound scenario, the process is reversed, in which a tote with the desired item is picked from the respective bay in the shelf 506 of the rack 502 by the shuttle 510 and dropped at the station conveyor 514 associated with the corresponding shelf 506, to be transferred to the conveyor arrangement 420 via the lift 516. As discussed, identifiers, such as barcodes, QR codes, or Bluetooth™ transmitters, on the totes allow them to be automatically routed to specific destinations within the warehouse 400.

Further, as illustrated in FIG. 5, the warehouse 400 includes the one or more infeed stations 430. As discussed, the conveyor arrangement 420 connects the item retrieval arrangement 410 to the one or more infeed stations 430 in the warehouse 400. As may be seen, the item retrieval arrangement 410 is located at one end 422 of the conveyor arrangement 420 and the one or more infeed stations 430 are located at other end 424 of the conveyor arrangement 420. Herein, the item retrieval arrangement 410 is configured to retrieve items associated with one or more orders from the storage area 500 in the warehouse 400 and place the retrieved items at the conveyor arrangement 420, to be transferred to the one or more infeed stations 430 in the warehouse 400.

Figure 6:
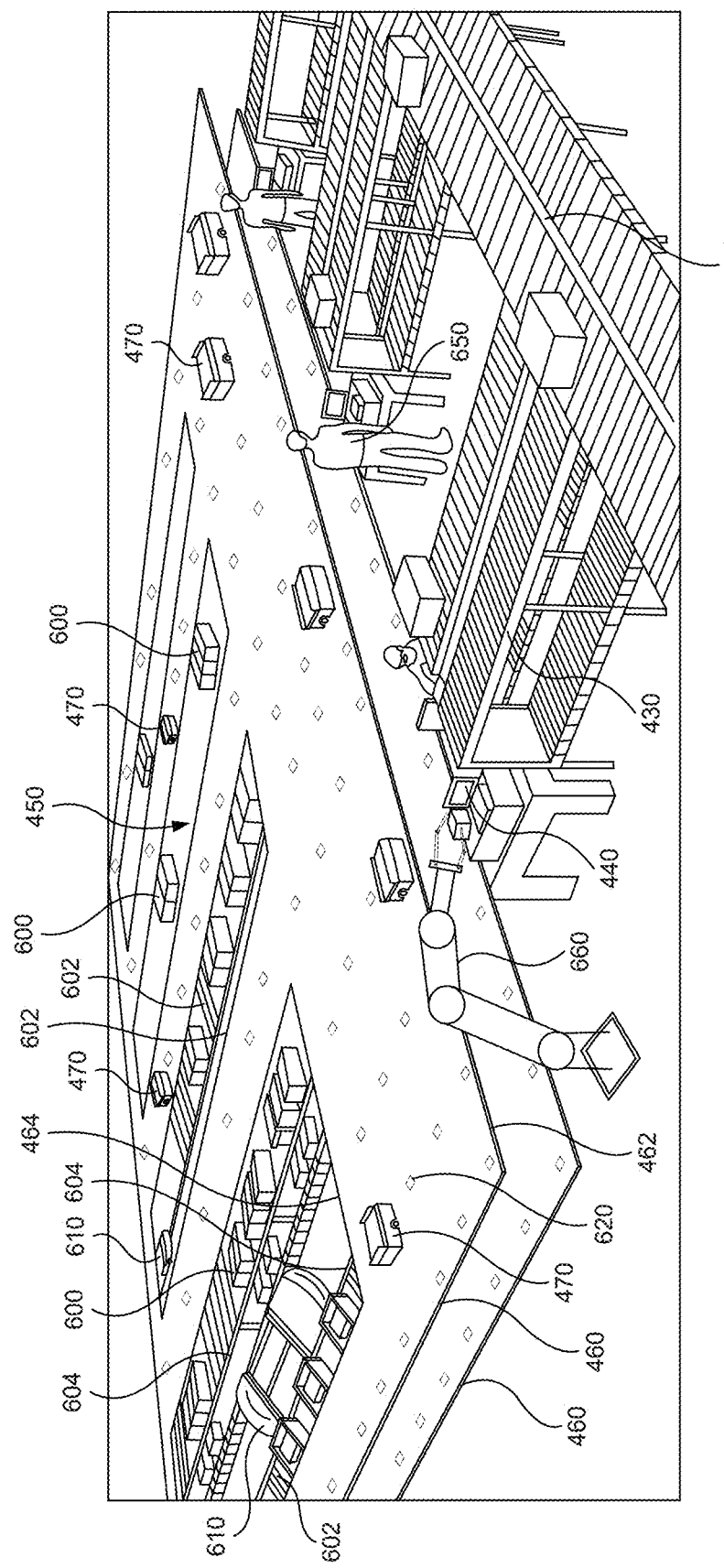
FIG. 6 illustrates a simplified diagrammatic illustration of a portion of the warehouse management system showing a scanning unit provided at each of the one or more infeed stations, and one or more platform levels with the one or more infeed stations located adjacent to one side thereof and an item transfer arrangement located adjacent to other side thereof, in accordance with one or more exemplary embodiments of the present disclosure.

Referring now to FIG. 6, illustrated is a simplified diagrammatic illustration of a portion of the warehouse management system 400 showing the scanning unit 440 provided at each of the one or more infeed stations 430, the item transfer arrangement 450 and the one or more platform levels 460, in accordance with one or more exemplary embodiments of the present disclosure. In the illustration of FIG. 6, the warehouse 400 is shown to include two platform levels 460. As shown in FIG. 6, the one or more platform levels 460 are positioned with the one or more infeed stations 430 located adjacent to one side 462 thereof and the item transfer arrangement 450 located adjacent to other side 464 thereof. The infeed stations 430 act as an intermediate space between the item retrieval arrangement 410 and the one or more platform levels 460, and thereby to the item transfer arrangement 450. In the present embodiments, each of the one or more infeed stations 430 is provided with at least one of the scanning unit 440. Herein, the scanning unit 440 is configured to be implemented for scanning the items received at corresponding one of the one or more infeed stations 430 to generate a scan information therefor. For this purpose, each of the items may have an identification code (not shown) associated therewith, which may be scanned by the scanning unit 440. The identification code may be in the form of a barcode, a QR code, an RFID tag, or simply an alpha-numeric code, without any limitations. Accordingly, the scanning unit 440 may be in the form of an imaging unit (like a camera or a barcode scanner) or an RFID reader, for reading the identification code, to generate the scan information therefor. Herein, the scan information for the item is representative for unique identification (as read from the said identification code) of the item for identifying the corresponding item from the plurality of items in the warehouse 400.

Further, as illustrated in FIG. 6, the warehouse 400 includes the one or more platform levels 460 with the one or more infeed stations 430 located adjacent to the one side 462 thereof and the item transfer arrangement 450 located adjacent to the other side 464 thereof. Further, the warehouse 400 includes the one or more sorting robots 470 provided on each of the one or more platform levels 460. In one example, one or more human operators (as represented by numeral 650) may be positioned at each of the one or more infeed stations 430, and those human operators 650 may pick up the received items at the other end 424 of the conveyor arrangement 420 and implement the scanning unit 440 for scanning of the item thereby. That is, for instance, the human operators 650 may pick the item from the conveyor arrangement 420, face the item (or specifically the identification code thereof) to the scanning unit 440 to be scanned thereby, and drop the item to one of the one or more sorting robots 470 positioned adjacent to the corresponding one of the one or more infeed stations 430, on the one or more platform levels 460. In other examples, the warehouse execution system 400 includes a robotic manipulator 660 provided at each of the one or more infeed stations 430. Herein, the robotic manipulator 660 may be utilized in place of the human operator(s). The robotic manipulator 660 is configured to pick the item received at corresponding one of the one or more infeed stations 430; manipulate the item to allow for scanning thereof by the scanning unit 440; and drop the item to the said one of the one or more sorting robots 470. That is, the robotic manipulator 660, as employed for the purposes of the present disclosure, is capable of gripping and picking items from the conveyor arrangement 420, moving the item to the scanning unit 440, manipulating (changing orientation) of the item such that the identification code faces the scanning unit 440 if required, and dropping the scanned item to one of the one or more sorting robots 470 positioned adjacent to the corresponding one of the one or more infeed stations 430. In the present examples, the robotic manipulator 660 may be in the form of a six-axis robotic arm as known in the art; however, any other type of the robotic manipulator capable of picking, moving and dropping items may be utilized, including robotic gantry, etc, without any limitations.

Further, as illustrated in FIG. 6, the item transfer arrangement 450 has a plurality of storage bins 600. In embodiments of the present disclosure, the item transfer arrangement 450 is configured to transfer the storage bins 600 of the plurality of storage bins 600 to a packaging station (not shown) in the warehouse 400. Specifically, as may be seen in FIG. 6, the item transfer arrangement 450 is located at the said other side 464 of the one or more platform levels 460.

Herein, the item transfer arrangement 450 includes one or more buffer lines 602 arranged at one or more transfer levels 604 (better shown and described with reference to FIG. 7, as discussed later) corresponding to the one or more platform levels 460 with each of the one or more buffer lines 602 having one or more of the plurality of storage bins 600 placed thereon, such that the one or more sorting robots 470 transfer the items to the storage bins 600 on the buffer lines 602 at the transfer level 604 corresponding to the underneath platform level 460. As discussed, in the illustration of FIG. 6, the warehouse 400 is shown to include two platform levels 460, and thereby two transfer levels 604 corresponding to the two platform levels 460. In other words, the item transfer arrangement 450 includes one or more transfer levels 604, with each of the one or more transfer levels 604 having one or more buffer lines 602. Further, each of the one or more buffer lines 602 have one or more of the plurality of storage bins 600 placed thereon.

In an embodiment, at least two buffer lines 602 are arranged at each of the one or more transfer levels 604. The said at least two buffer lines 602 are disposed in the form of a pair of buffer lines 602 (as better seen in FIG. 7, as discussed later). The item transfer arrangement 450 further includes at least one shuttle 610 arranged intermediate and associated with each of the at least two buffer lines 602. That is, the at least one shuttle 610 is assigned to the said pair of buffer lines 602 and disposed between the two buffer lines 602 of the said pair of buffer lines 602. The at least one shuttle 610 is configured to pick the storage bin(s) 600 from each of the at least two buffer lines 602 to be transferred to the packaging station, in the warehouse 400. In other words, the single shuttle 610 caters to each of the two buffer lines 602 in the said pair of buffer lines 602, to pick up storage bins 600 from each of the two buffer lines 602 in the associated pair of buffer lines 602, transfer the storage bins 600 as required and drop the storage bins 600 to each of the two buffer lines 602 in the associated pair of buffer lines 602. It may be contemplated that the said shuttle 610 may generally be similar in design and configuration to the shuttle 510 as discussed above, and thus details for the shuttle 610 have not been repeated herein for the brevity of the present disclosure.

Further, as may be seen from FIG. 6, the one or more sorting robots 470 are configured to travel on the platform level 460 underneath thereof to transfer the items from the one or more infeed stations 430 to one of the storage bins 600 of the plurality of storage bins 600 in the item transfer arrangement 450. Herein, each of the platform levels 460 have plurality of markers 620 (as shown in FIG. 6) formed thereon. Herein, the markers 620 may be in the form of colour-coded markers, magnetic markers or the like, which are well known and are widely implemented in factories' floor and the like for purposed of robot navigation. The sorting robots 470 are in the form of mobile robots that are configured to follow a travel path defined by combination of multiple markers 620, on the corresponding platform level 460. Usually, the sorting robots 470 are configured to follow a straight-line path between two markers 620 of the plurality of markers 620. The sorting robots 470 is thereby capable of travelling on the platform level 460 underneath thereof to transfer the items from the one or more infeed stations 430 to one of the storage bins 600 of the plurality of storage bins 600 in the item transfer arrangement 450.

As discussed, the one or more sorting robots 470 are configured to travel on the platform level 460 (of the one or more platform levels 460) underneath thereof to transfer the items from the one or more infeed stations 430 to one of the storage bins 600 of the plurality of storage bins 600 in the item transfer arrangement 450. Again, as may be seen from FIG. 6, the platform levels 460 may extend along a length of the buffer lines 602 from the said other side 464 thereof. Further, as shown, the markers 620 may be provided along the extended portion of the buffer lines 602, so that the sorting robots 470 travelling on the platform level 460 underneath thereof are able to transfer the item thereon to any of the storage bins 600 placed on the buffer lines 602 at the transfer level 604 corresponding to the underneath platform level 460. In the present embodiments, the sorting robot 470 may be configured to drop the item into the storage bin 600, by tilting of the storage space therein or any other mechanism as known in the art.

Figure 7:
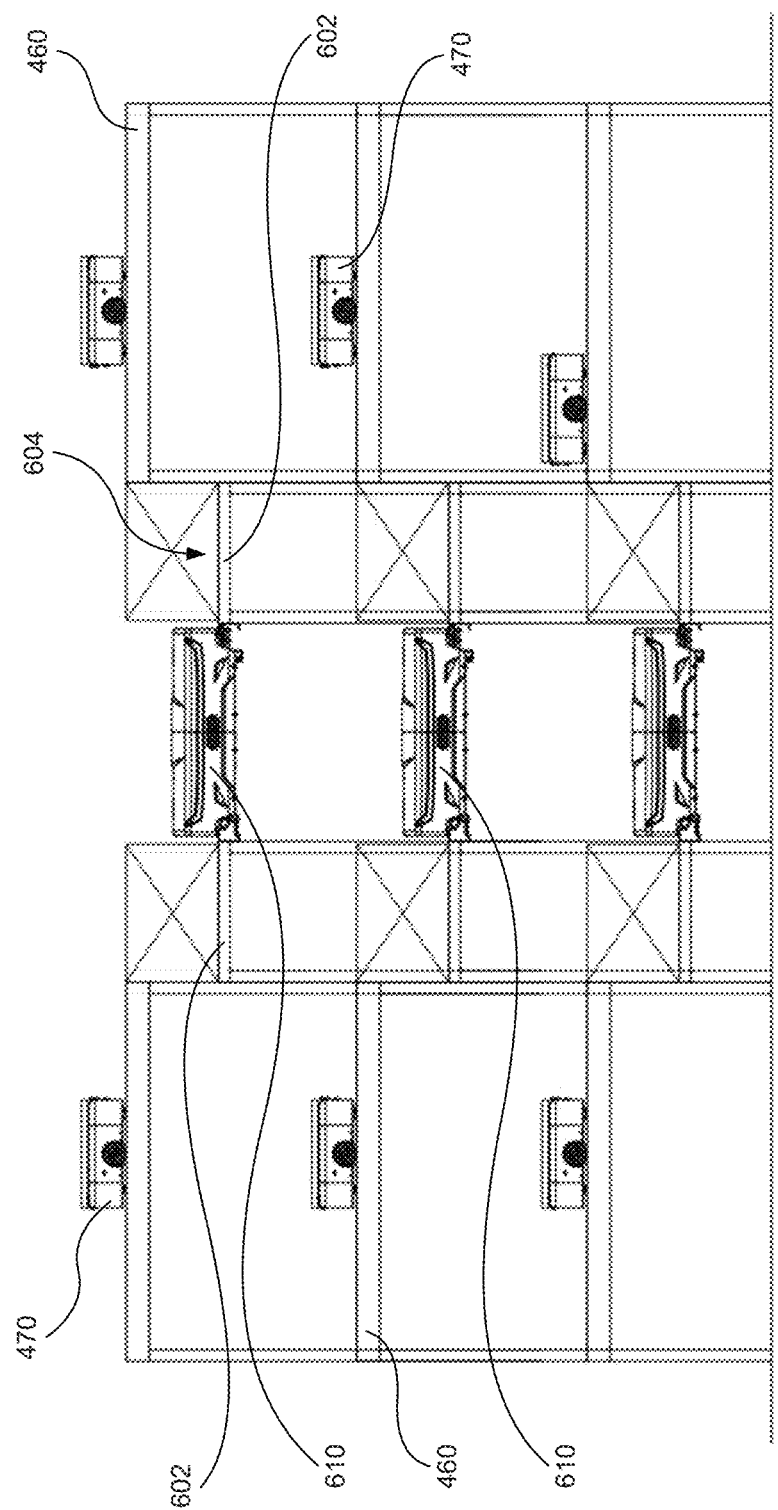
FIG. 7 illustrates a simplified side plan view illustration of a portion of the warehouse management system showing multiple platform levels with correspondence to transfer levels in the item transfer arrangement, in accordance with one or more exemplary embodiments of the present disclosure.

FIG. 7 illustrates a simplified side plan view illustration of a portion of the warehouse management system 400 showing multiple platform levels 460 with correspondence to transfer levels 604 in the item transfer arrangement 450, in accordance with one or more exemplary embodiments of the present disclosure. In the illustration of FIG. 7, the warehouse 400 is shown to include three platform levels 460 and correspondingly three transfer levels 604 in the item transfer arrangement 450; however, it may be contemplated that the warehouse 400 may include more or less number of such corresponding levels 460, 604 without departing from the spirit and the scope of the present disclosure. Further, each of the transfer level 604 includes at least two buffer lines 602, with at least one shuttle 610 arranged intermediate and associated with each of the at least two buffer lines 602. As may be contemplated from the illustration of FIG. 7, the sorting robot 470 at one of the platform levels 460 may transfer the item to one of the storage bins 600 at the transfer level 604 corresponding to the platform level 460 underneath thereof.

Similarly, it may be appreciated that the one or more out-bound conveyors 480, in the item transfer arrangement 450, are arranged at the one or more transfer levels 604. That is, the number of levels of the out-bound conveyors 480 are same and correspond to the transfer levels 604, in the item transfer arrangement 450. Referring again to FIGS. 4 and 6 in combination, as may be seen, the out-bound conveyor 480 is arranged with first ends 482 thereof being disposed adjacent to the buffer lines 602 of the corresponding transfer level 604, and a second end 484 thereof being disposed adjacent to the packaging station. Herein, the one or more out-bound conveyors 480 are configured to receive the storage bin 600 from the at least one shuttle 610 of the corresponding transfer level 604 at the respective first ends 482 thereof and transfer the said assigned storage bin to the packaging station at the respective second end 484 thereof. Further, as shown in FIG. 4, the in-bound conveyor 490 is arranged with a first end 492 thereof being disposed adjacent to the packaging station, and a second end 494 thereof being disposed adjacent to most distant of the first ends 482 of the corresponding out-bound conveyor 480 in the corresponding transfer level 604. Herein, the one or more in-bound conveyors 490 are configured to receive one or more empty storage bins 600 from the packaging station at the respective first end 492 thereof and transfer the received empty storage bins to the respective second end 494 thereof to be picked by the at least one shuttle 610 of the corresponding transfer level 604.

In the warehouse 400, as discussed, the storage bins 600 with the items associated with the order being processed therein are received at the packaging station via the one or more out-bound conveyors 480. Herein, at the packaging station, those items are removed from the storage bins 600 and the empty storage bins are placed onto the one or more in-bound conveyors 490 at the first end 492 thereof. Again, referring to FIGS. 4 and 6 in combination, in the present embodiments, the at least one shuttle 610 is further configured to pick the one or more empty storage bins 600 from the in-bound conveyor 490 of the corresponding transfer level 604 from the second end 494 thereof and transfer the picked one or more empty storage bins 600 to one of the associated at least two buffer lines 602. That is, when the empty storage bin 600, as transferred from the packaging station, is received at the second end 494 of the in-bound conveyor 490, such empty storage bin 600 is picked back by the at least one shuttle 610 of the corresponding transfer level 604 and subsequently transferred back to one of the buffer lines 602 to be placed thereon, based on availability of space to accommodate such empty storage bin 600 therein.

Now, as discussed, the warehouse execution system 400 of the present disclosure includes the controller 200. The controller 200, herein, may act as the server device issuing commands to control the various components, including the item retrieval arrangement 410, the conveyor arrangement 420, the robotic manipulators 660 at the one or more infeed stations 430, the one or more sorting robots 470 and the at least one shuttle 610 in the item transfer arrangement 450. In the present embodiments, the controller 200 is configured to control the said components for achieving consolidating of items for fulfilment of orders in the warehouse 400 in an efficient manner.

Herein, the controller 200 may be any processing device, system or part thereof that controls at least one operation of the device. The controller 200 may be implemented in hardware, firmware or software, or some combination of at least two of the same. It should be noted that the functionality associated with any particular controller may be centralized or distributed, whether locally or remotely. The controller 200 may be a multi-core processor, a single core processor, or a combination of one or more multi-core processors and one or more single core processors. For example, the one or more processors may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. Further, the memory may include one or more non-transitory computer-readable storage media that can be read or accessed by other components in the device. The memory may be any computer-readable storage media, including volatile and/or non-volatile storage components, such as optical, magnetic, organic or other memory or disc storage, which can be integrated in whole or in part with the device. In some examples, the memory may be implemented using a single physical device (e.g., optical, magnetic, organic or other memory or disc storage unit), while in other embodiments, the memory may be implemented using two or more physical devices without any limitations.

As discussed, in the warehouse 400, a single order may demand multiple items, including different types of products. Multiple items as part of a single order may need to be grouped together for efficient delivery. These different types of products may need to be picked from multiple racks 502 and then consolidated as per the order. Herein, the warehouse 400 may act as a temporary storing space for the items, with the items coming in being stored in the warehouse 400 temporarily to be shipped to their respective destinations. According to embodiments of the present disclosure, the controller 200 is configured to receive order information about the one or more items to be delivered as part of the single order. Herein, the order information may be in the form of invoice information comprising a list of the one or more items associated with the order. The invoice information provides details about one or more customers, include details such as the delivery address, to which the items need to be delivered. In the present examples, multiple items related to the single order are consolidated (grouped) together and shipped to the provided address of the customer for efficient delivery.

The controller 200 is configured to execute a command for an order being processed with information about one or more items associated therewith. In an example, the controller 200 may execute a command for processing a batch of orders which may be scheduled as per predefined intervals, i.e., after every predefined period of time. Herein, for example, such command may be executed by the controller 200 after every 15 minutes. In an embodiment, the controller 200 is configured to determine the orders that may be grouped in a given batch of orders based on delivery information of the selected orders therein. That is, the controller 200 may group those orders together which may need to be delivered at same or close-by geographical locations. This ensures that when the items for each order are consolidated and packed together as a delivery package, the delivery packages for other orders in the given batch of orders are also available generally at the same time, so that all the said delivery packages associated to the said given batch of orders may be picked up at the same time, to be delivered together using a single or multiple delivery vehicles as required.

In an embodiment, the controller 200 is further configured to execute the command for the order being processed based on availability of one or more of: the item retrieval arrangement 410, the one or more infeed stations 430, the one or more sorting robots 470 and the item transfer arrangement 450, for respective processing of the said at least one item associated with the order being processed. In particular, the controller 200 is configured to execute the command for the order being processed based on availability of one or more of: the item retrieval arrangement 410, the robotic manipulators 660 at the one or more infeed stations 430, the one or more sorting robots 470 and the at least one shuttle 610 in the item transfer arrangement 450, for respective processing of the one or more items associated with the order being processed. For this purpose, in an example embodiment, the controller 200 may check availability, for processing of items associated with the order being processed, of each of the item retrieval arrangement 410, the robotic manipulators 660 at the one or more infeed stations 430, the one or more sorting robots 470 and the at least one shuttle 610. The controller 200 may determine if any of the said components may be causing bottleneck due to that particular component being already in processed of pending items related to the same order or some other order; and if that may be the case, the controller 200 may delay the next command by temporarily increasing the said predefined interval, so as to allow the component causing the bottleneck sufficient time to process the item thereat; and vice-versa. This enables for smoother operation of the warehouse for efficient consolidation of items for fulfilment of orders therein.

Further, the controller 200 is configured to implement the item retrieval arrangement 410 to retrieve, at one instance, at least one item of the one or more items associated with the order being processed and implement the conveyor arrangement 420 to transfer the retrieved at least one item to one of the one or more infeed stations 430, in response to the executed command. That is, the item retrieval arrangement 410 may retrieve one of the items of the order being processed. It may be appreciated that the item retrieval arrangement 410 may simultaneously retrieve other items of the order being processed. Further, the item retrieval arrangement 410 may parallelly retrieve items of other orders being processed as part of the batch of the orders as per the executed command. The steps involved in the retrieval of items via the item retrieval arrangement 410 may be understood based on the description provided above, and thus not repeated herein for the brevity of the present disclosure. The item retrieval arrangement 410 may one-by-one (or parallelly) transfer the retrieved items to the conveyor arrangement 420.

As discussed, the conveyor arrangement 420 transfers the retrieved at least one item to one of the one or more infeed stations 430. The conveyor arrangement 420 may receive the retrieved items from the item retrieval arrangement 410. Herein, the conveyor arrangement 420 may be in the form of continuously moving conveyor belt that transfers the retrieved items as received from the item retrieval arrangement 410 towards the one or more infeed stations 430. Generally, the warehouse 400 may include a transfer mechanism (not shown), such as a rotating table or the like, adjacent to each of the infeed stations 430 to move the item from the conveyor arrangement 420 to the corresponding infeed station 430. In an embodiment, the controller 200 is further configured to implement the conveyor arrangement 420 to transfer the retrieved at least one item to one of the one or more infeed stations 430 based on availability thereof for processing of the at least one item associated with the order being processed. In particular, the controller 200 is configured to implement the conveyor arrangement 420 to transfer the retrieved at least one item to one of the one or more infeed stations 430 based on availability of the corresponding robotic manipulator 660 to pick the item thereat. That is, in case of there being multiple infeed stations 430, and with one of the robotic manipulators 660 at any one of the said multiple infeed stations 430 being already in process of handling the item when the item is at a point on the conveyor arrangement 420 for where it may be transferred to the corresponding infeed station 430, the controller 200 may let the item move further to next infeed station 430 of the said multiple infeed stations 430 at which the corresponding robotic manipulator 660 may be available to handle the said item when received thereat. In case of human operators 650 handling items at the infeed stations 430, the controller 200 may determine to transfer (direct) the item to one of the infeed stations based on the number of items being in queue thereat (i.e., not scanned as yet) which were previously transferred thereat. It may be appreciated that this is done so as to reduce the bottleneck and increase the warehouse output.

When the item is received at one of the infeed station 430, the human operator 650 or the robotic manipulator 660 available thereat may pick the item and manipulate the item to allow for scanning thereof by the scanning unit 440, which in turn generate the scan information therefor (as discussed above). Further, the controller 200 is configured to acquire, from the scanning unit 440, the scan information for the said at least one item received at corresponding one of the one or more infeed stations 430. Herein, the acquired scan information allows the controller 200 to determine of which order the scanned item is part of. This may be confirmed by the controller based on the order information, as described above. In the embodiments of the present disclosure, this process helps the controller to, generally, define where to move the scanned item (part of the order being processed) in the warehouse 400 such that other items of the same order could be consolidated with the said item.

Herein, the controller 200 is configured to assign one of the storage bins 600 of the plurality of storage bins 600 at the item transfer arrangement 450 to the order being processed based on the acquired scan information. That is, the controller 200 may fix one of the storage bins 600 at the item transfer arrangement 450 for a particular order; in this case, the order being processed. If the scanned item is a first item to be scanned of the multiple items of the order being processed, then the controller 200 may assign one of the empty storage bins 600 available at the item transfer arrangement 450. On the other hand, if the scanned item is one of the multiple items of the order being processed of which at least one item (say, the said first item) has already been scanned, then the controller 200 may assign the same storage bin 600 as assigned to the other items of the same order, at the item transfer arrangement 450. It may be appreciated that this is done so that when all the items of the order being processed have been transferred to the assigned storage bin 600, the items would be consolidated as required for fulfilment of the order.

Further, the controller 200 is configured to implement one of the one or more sorting robots 470 to collect the said at least one item from the said one of the one or more infeed stations 430 and transfer the said at least one item to the assigned storage bin 600 to the order being processed. Herein, the controller 200 may issue command for controlling the sorting robots 470, such that one of the available sorting robots 470 moves to a position adjacent to the infeed station 430 where the item has been scanned, so as to receive the scanned item thereon. The controller 200 may control such sorting robot 470 to move so as to be readily available once the scan process may be completed. This may be achieved by estimating usual time taken for the item to be scanned at the infeed station 430 (separately for both the human operator 650 as well as the robotic manipulator 660) and the possible time to be taken by the available sorting robot 470 to reach the said position. It may generally be understood that the closest available sorting robot 470 is implemented for the purpose, for reducing time to reach the said position and distance travelled by the implemented sorting robot 470.

In an embodiment, the controller 200 is further configured to implement one of the one or more sorting robots 470, available to receive the said at least item thereon, to be positioned at the corresponding platform level 460 adjacent to one of the one or more infeed stations 430 to receive the item thereon in a distributed manner. That is, the controller 200 ensures that the sorting robots 470 from each of the one or more platform levels 460 are utilized to receive the items thereon from the one or more infeed stations 430, for further transfer to the item transfer arrangement 450. It may be appreciated that this may be necessary so that not just all the sorting robots 470 available at various platform levels 460 are utilized efficiently, but also the various storage bins 600 located at various transfer levels 604 are also filled (as will be discussed in the subsequent paragraph) in a more efficient manner.

Figure 8:
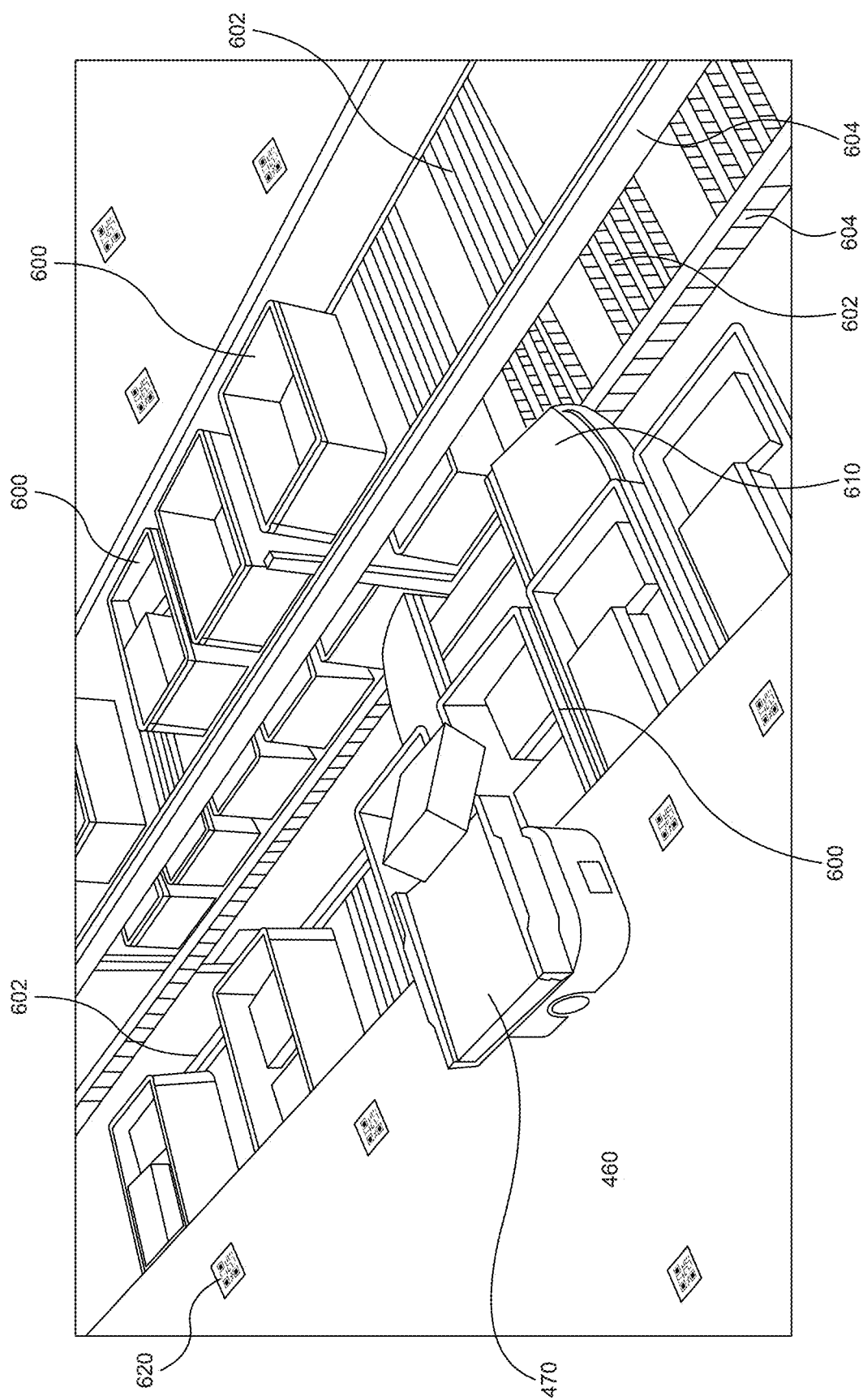
FIGS. 8-10 illustrate simplified diagrammatic illustrations of different portions of the warehouse management system showing stages involved in operation for consolidating items for fulfilment of orders in a warehouse, in accordance with one or more exemplary embodiments of the present disclosure.

Thereafter, the item may be placed on the sorting robot 470 and the same sorting robot 470 may travel on the corresponding platform level to reach a point adjacent to the buffer line 602 in the item transfer arrangement where the assigned storage bin 600 to the item placed thereon is located (as shown in FIG. 8). Herein, the controller 200 may determine the location of the assigned storage bin 600 based on any known technique, including but not limited to, the number of the storage bins 600 placed on the respective buffer line 602 at any given instant. In the present embodiments, the controller 200 may further define a path to be travelled by the implemented sorting robot 470 so as to avoid collision and cause minimal obstruction to other sorting robot 470 travelling on the same platform level 460, as the implemented sorting robot 470 moves thereon. When the implemented sorting robot 470 reaches the said location, the sorting robot 470 may drop the item placed thereon into the assigned storage bin 600 thereto.

Further, the controller 200 is configured to implement the item transfer arrangement 450 to transfer the said assigned storage bin 600 to the packaging station, when each of the one or more items associated with the order being processed are transferred to the said assigned storage bin 600. That is, when all the items associated with the order being processed may have been consolidated in the respective assigned storage bin 600, the item transfer arrangement 450 transfers such storage bin 600 to the packaging station for further processing, such as combined packing of all the consolidated items at the packaging station or the like. This results in efficient grouping of items for fulfilment of the order being processed, as the human operator at the packaging station or the like may not have to sort the items as per the order. In an example, when the order may be large, i.e., the order may have more items than it could be accommodated into a single storage bin 600, then multiple storage bins 600 are assigned to such particular order, and each of the multiple storage bins 600 are allowed to be filled with the items, until all the items of such particular order have been received in the said multiple storage bins 600, and those multiple storage bins 600 may be transported consecutively by the one or more shuttles 610 in the item transfer arrangement 450 so as to be dropped at the one or more out-bound conveyors 480 one after the other, and thereby reach the packaging station generally simultaneously, and be grouped together as part of the single order for further processing.

Figure 9:
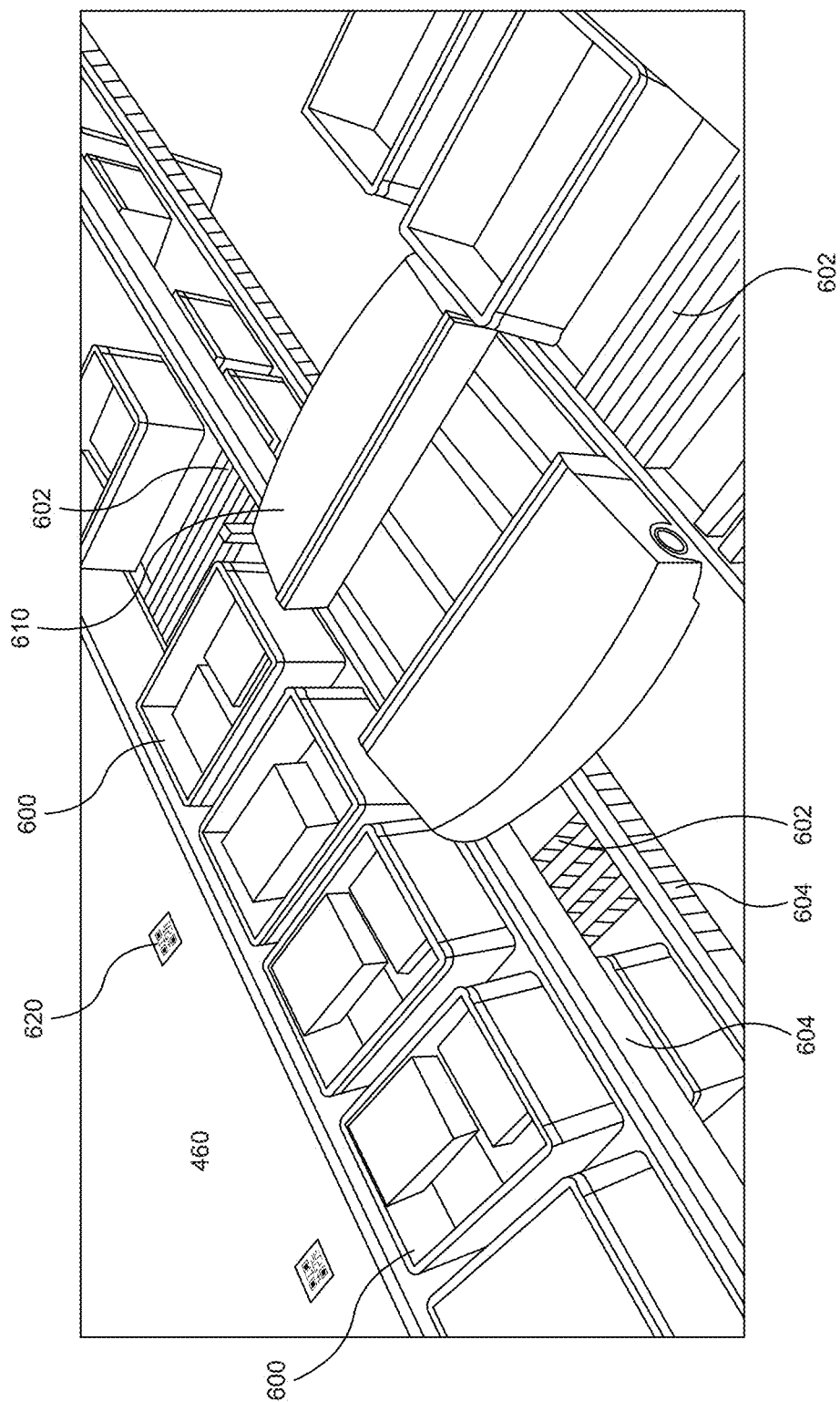
Figure 10:
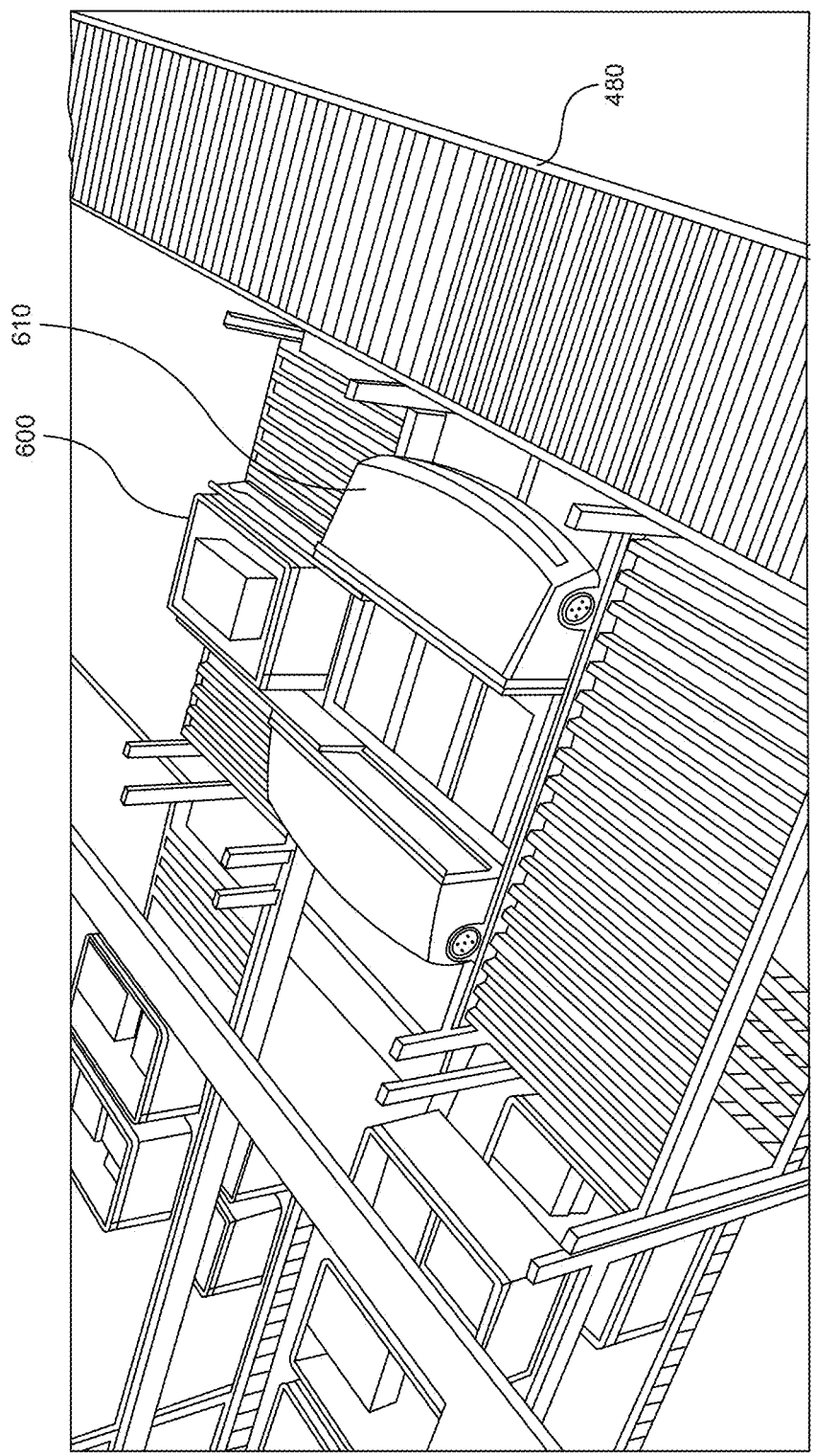

The transfer of the storage bin 600 in the item transfer arrangement 450 may involve picking of the storage bin 600 by the corresponding at least one shuttle 610 (as shown in FIG. 9), transferring the picked storage bin 600 to one of the one or more out-bound conveyors 480 (as shown in FIG. 10) at the corresponding first end 482 thereof, so as to be moved to the packaging station located at the second end 484 of the implemented out-bound conveyor 480. Further, the empty storage bins 600 may be transferred back to be utilized by placing those at the first end 492 of the in-bound conveyor 490. As discussed, in one or more embodiments, the at least one shuttle 610 is further configured to pick the one or more empty storage bins 600 from the in-bound conveyor 490 of the corresponding transfer level 604 from the second end 494 thereof and transfer the picked one or more empty storage bins to one of the associated at least two buffer lines 602. Such steps may be contemplated by a person skilled in the art and thus have not been described in detail herein for the brevity of the present disclosure.

The present disclosure further provides a method for consolidating items for fulfilment of orders in a warehouse (such as, the warehouse 400). Various embodiments and variants disclosed above, with respect to the aforementioned system 400, apply mutatis mutandis to the present method for managing items for fulfilment of an order in the warehouse.

Figure 11:
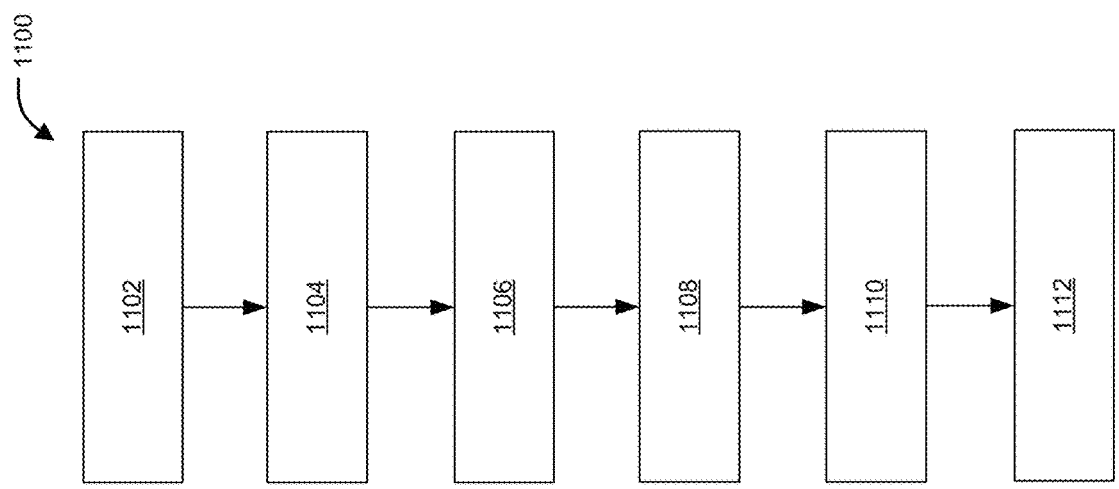
FIG. 11 illustrates a flowchart listing steps involved in a method for consolidating items for fulfilment of orders in a warehouse, in accordance with one or more exemplary embodiments of the present disclosure.

FIG. 11 illustrates a flowchart 1100 listing steps involved in the said method for consolidating items for fulfilment of orders in a warehouse. At step 1102, the method comprises executing a command for an order being processed with information about one or more items associated therewith. At step 1104, the method comprises implementing an item retrieval arrangement to retrieve, at one instance, at least one item of the one or more items associated with the order being processed and implement the conveyor arrangement to transfer the retrieved at least one item to one of one or more infeed stations in the warehouse, in response to the executed command. At step 1106, the method comprises implementing a scanning unit provided at each of the one or more infeed stations, for scanning the items received thereat to generate a scan information therefor. At step 1108, the method comprises assigning one of storage bins of a plurality of storage bins at an item transfer arrangement to the order being processed based on the acquired scan information. At step 1110, the method comprises implementing one of one or more sorting robots, provided on one or more platform levels with the one or more infeed stations located adjacent to one side thereof and the item transfer arrangement located adjacent to other side thereof, to collect the said at least one item from the said one of the one or more infeed stations and transfer the said at least one item to the assigned storage bin to the order being processed. At step 1112, the method comprises implementing the item transfer arrangement to transfer the said assigned storage bin to a packaging station in the warehouse, when each of the one or more items associated with the order being processed are transferred to the said assigned storage bin.

In one or more embodiments, the method comprises providing one or more buffer lines arranged at one or more transfer levels corresponding to the one or more platform levels with each of the one or more buffer lines having one or more of the plurality of storage bins placed thereon, such that the one or more sorting robots transfer the items to the buffer lines at the transfer level corresponding to the underneath platform level.

In one or more embodiments, the method comprises providing at least two buffer lines arranged at each of the one or more transfer levels, and at least one shuttle arranged intermediate and associated with each of the at least two buffer lines to pick the said assigned storage bin from one of the at least two buffer lines to be transferred to the packaging station.

In one or more embodiments, the method comprises providing one or more out-bound conveyors arranged at the one or more transfer levels and configured to receive the said assigned storage bin from the at least one shuttle of the corresponding transfer level at respective first ends thereof and transfer the said assigned storage bin to the packaging station at a respective second end thereof; and providing one or more in-bound conveyors arranged at the one or more transfer levels and configured to receive one or more empty storage bins from the packaging station at respective first end thereof and transfer the received empty storage bins to respective second end thereof to be picked by the at least one shuttle of the corresponding transfer level.

In one or more embodiments, the method comprises implementing the at least one shuttle to pick the one or more empty storage bins from the in-bound conveyor of the corresponding transfer level from the second end thereof and transfer the picked one or more empty storage bins to one of the associated at least two buffer lines.

In one or more embodiments, the method comprises providing a robotic manipulator at each of the one or more infeed stations, and implementing the robotic manipulator to: pick the item received at corresponding one of the one or more infeed stations; manipulate the item to allow for scanning thereof by the scanning unit; and drop the item to the said one of the one or more sorting robots.

In one or more embodiments, the method comprises executing the command for the order being processed based on availability of one or more of: the item retrieval arrangement, the one or more infeed stations, the one or more sorting robots and the item transfer arrangement, for respective processing of the said at least one item associated with the order being processed.

In one or more embodiments, the method comprises implementing the conveyor arrangement to transfer the retrieved at least one item to one of the one or more infeed stations based on availability thereof for processing of the at least one item associated with the order being processed.

In one or more embodiments, the method comprises implementing one of the one or more sorting robots, available to receive the item thereon, to be positioned at the corresponding platform level adjacent to one of the one or more infeed stations to receive the item thereon in a distributed manner.

In the present system and method, it is ensured that the items are diverted to operators at the infeed station in such a way that consolidative time of order is minimized. Further, the items for various orders are distributed in such a way that the sorting robots travel a minimum distance between the infeed station and the item transfer arrangement. The present system and method further avoid cross transfer ensuring one sorting robot does not obstruct the path of other sorting robots. Further, the present system and method ensure that the items are distributed in various platform levels and various buffer lines so that the output is maximized; i.e., distributes the load at multi levels so that the sortation per unit area is maximized.

The systems and methods of the present disclosure can be utilized for multi-level sorting robot implementations (which are generally beyond human reach) and further for transporting of items for order fulfilment from one point to another in the warehouse in a fully autonomous manner. Given the repetitive nature of the task of consolidating orders, the present disclosure helps to eliminate the need for manpower, resulting in a fully automated system of order box collection and transportation, employing a mix of sorting robots, carton shuttles, conveyors and software to coordinate all activities. The present system helps with automated consolidation of multiple orders starting from 50 to 10,000 plus orders simultaneously in one batch of orders, as per the issued command by the warehouse execution system. The present disclosure provides automated retrieval of consolidated orders for further processing, and further provides automated placement of empty storage bins for processing of further orders. The present system enables efficient usage of cubic space for consolidation in the warehouse. Also, by coordinating these activities powered by the present Warehouse Execution System would help maintain real-time tracking of items associated with various orders across the warehouse leading to higher accuracy at this stage of the operation, eliminating the chances of pilferage and inaccurate order consolidation. The present system also helps to eliminate human risk which exists in case of required transfer of items at upper platform levels or the like, by implementation of robotic manipulators.

The systems and methods of the present disclosure provide an effective solution for consolidating items for fulfilment of orders in a warehouse. The present disclosure leads to considerable reduction of variable cost, such as elimination of searching of items, elimination of manpower for sorting the items, efficient last mile delivery, efficient cross dock process at later stages of supply chain including staging of items, etc. Implementation of the present system and method results in maximum space and resource utilization in the warehouse, and results in fastest possible fulfilment of an order. The system and method of the present disclosure may further be implemented for a consistent throughput from the warehouse. This may help to design the warehouse in consideration of the maximum throughput capacity that may be required from to-be designed warehouse with maximum utilization of the resources (such as, lifts and shuttles) and thereby, in turn, can be used to, generally, reduce the number of such components required and result in savings in the overall cost involved during the initial set-up of the warehouse. The resultant of the implementation of the embodiments of the present disclosure also leads to faster delivery of items to the customer, which result in customer satisfaction.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

The invention claimed is:

1. A warehouse execution system for consolidating items for fulfilment of orders in a warehouse, comprising:
   an item retrieval arrangement configured to retrieve items associated with one or more orders from a storage area in the warehouse and place the retrieved items at a conveyor arrangement to be transferred to one or more infeed stations in the warehouse;
   a scanning unit provided at each of the one or more infeed stations, the scanning unit configured to be implemented for scanning the items received thereat to generate a scan information therefor;
   an item transfer arrangement having a plurality of storage bins, the item transfer arrangement configured to transfer the storage bins of the plurality of storage bins to a packaging station in the warehouse;
   one or more platform levels with the one or more infeed stations located adjacent to one side thereof and the item transfer arrangement located adjacent to other side thereof;
   one or more sorting robots provided on each of the one or more platform levels, the one or more sorting robots configured to travel on the platform level underneath thereof to transfer the items from the one or more infeed stations to one of the storage bins of the plurality of storage bins in the item transfer arrangement; and
   a controller configured to:
      execute a command for an order being processed with information about one or more items associated therewith,
      implement the item retrieval arrangement to retrieve, at one instance, at least one item of the one or more items associated with the order being processed and implement the conveyor arrangement to transfer the retrieved at least one item to one of the one or more infeed stations, in response to the executed command, acquire, from the scanning unit, the scan information for the said at least one item received at corresponding one of the one or more infeed stations, assign one of the storage bins of the plurality of storage bins at the item transfer arrangement to the order being processed based on the acquired scan information, implement one of the one or more sorting robots to collect the said at least one item from the said one of the one or more infeed stations and transfer the said at least one item to the assigned storage bin to the order being processed, and implement the item transfer arrangement to transfer the said assigned storage bin to the packaging station, when each of the one or more items associated with the order being processed are transferred to the said assigned storage bin.

2. The warehouse execution system as claimed in claim 1, wherein the item transfer arrangement comprises one or more buffer lines arranged at one or more transfer levels corresponding to the one or more platform levels with each of the one or more buffer lines having one or more of the plurality of storage bins placed thereon, such that the one or more sorting robots transfer the items to the buffer lines at the transfer level corresponding to the underneath platform level.

3. The warehouse execution system as claimed in claim 2, wherein at least two buffer lines are arranged at each of the one or more transfer levels, and wherein the item transfer arrangement further comprises at least one shuttle arranged intermediate and associated with each of the at least two buffer lines and configured to pick the said assigned storage bin from each of the at least two buffer lines to be transferred to the packaging station.

4. The warehouse execution system as claimed in claim 3, wherein the item transfer arrangement further comprises:

one or more out-bound conveyors arranged at the one or more transfer levels and configured to receive the said assigned storage bin from the at least one shuttle of the corresponding transfer level at respective first ends thereof and transfer the said assigned storage bin to the packaging station at a respective second end thereof; and one or more in-bound conveyors arranged at the one or more transfer levels and configured to receive one or more empty storage bins from the packaging station at respective first end thereof and transfer the received empty storage bins to respective second end thereof to be picked by the at least one shuttle of the corresponding transfer level.

5. The warehouse execution system as claimed in claim 4, wherein the at least one shuttle is further configured to pick the one or more empty storage bins from the in-bound conveyor of the corresponding transfer level from the second end thereof and transfer the picked one or more empty storage bins to one of the associated at least two buffer lines.

6. The warehouse execution system as claimed in claim 1, wherein the warehouse execution system further comprises a robotic manipulator provided at each of the one or more infeed stations, the robotic manipulator configured to:

pick the item received at corresponding one of the one or more infeed stations;

manipulate the item to allow for scanning thereof by the scanning unit; and drop the item to the said one of the one or more sorting robots.

7. The warehouse execution system as claimed in claim 1, wherein the controller is further configured to execute the command for the order being processed based on availability of one or more of: the item retrieval arrangement, the one or more infeed stations, the one or more sorting robots and the item transfer arrangement, for respective processing of the said at least one item associated with the order being processed.

8. The warehouse execution system as claimed in claim 1, wherein the controller is further configured to implement the conveyor arrangement to transfer the retrieved at least one item to one of the one or more infeed stations based on availability thereof for processing of the at least one item associated with the order being processed.

9. The warehouse execution system as claimed in claim 1, wherein the controller is further configured to implement one of the one or more sorting robots, available to receive the said at least item thereon, to be positioned at the corresponding platform level adjacent to one of the one or more infeed stations to receive the item thereon in a distributed manner.

10. A method for consolidating items for fulfilment of orders in a warehouse, comprising:

executing a command for an order being processed with information about one or more items associated therewith;

implementing an item retrieval arrangement to retrieve, at one instance, at least one item of the one or more items associated with the order being processed and implement the conveyor arrangement to transfer the retrieved at least one item to one of one or more infeed stations in the warehouse, in response to the executed command;

implementing a scanning unit provided at each of the one or more infeed stations, for scanning the items received thereat to generate a scan information therefor;

assigning one of storage bins of a plurality of storage bins at an item transfer arrangement to the order being processed based on the acquired scan information;

implementing one of one or more sorting robots, provided on one or more platform levels with the one or more infeed stations located adjacent to one side thereof and the item transfer arrangement located adjacent to other side thereof, to collect the said at least one item from the said one of the one or more infeed stations and transfer the said at least one item to the assigned storage bin to the order being processed; and implementing the item transfer arrangement to transfer the said assigned storage bin to a packaging station in the warehouse, when each of the one or more items associated with the order being processed are transferred to the said assigned storage bin.

11. The method as claimed in claim 10 further comprising providing one or more buffer lines arranged at one or more transfer levels corresponding to the one or more platform levels with each of the one or more buffer lines having one or more of the plurality of storage bins placed thereon, such that the one or more sorting robots transfer the items to the buffer lines at the transfer level corresponding to the underneath platform level.

12. The method as claimed in claim 11 further comprising providing at least two buffer lines arranged at each of the one or more transfer levels, and at least one shuttle arranged intermediate and associated with each of the at least two buffer lines to pick the said assigned storage bin from one of the at least two buffer lines to be transferred to the packaging station.

13. The method as claimed in claim 12 further comprising:
providing one or more out-bound conveyors arranged at the one or more transfer levels and configured to receive the said assigned storage bin from the at least one shuttle of the corresponding transfer level at respective first ends thereof and transfer the said assigned storage bin to the packaging station at a respective second end thereof; and
providing one or more in-bound conveyors arranged at the one or more transfer levels and configured to receive one or more empty storage bins from the packaging station at respective first end thereof and transfer the received empty storage bins to respective second end thereof to be picked by the at least one shuttle of the corresponding transfer level.

14. The method as claimed in claim 13 further comprising implementing the at least one shuttle to pick the one or more empty storage bins from the in-bound conveyor of the corresponding transfer level from the second end thereof and transfer the picked one or more empty storage bins to one of the associated at least two buffer lines.

15. The method as claimed in claim 14 further comprising providing a robotic manipulator at each of the one or more infeed stations, and implementing the robotic manipulator to:
pick the item received at corresponding one of the one or more infeed stations;
manipulate the item to allow for scanning thereof by the scanning unit; and
drop the item to the said one of the one or more sorting robots.

16. The method as claimed in claim 10 further comprising executing the command for the order being processed based on availability of one or more of: the item retrieval arrangement, the one or more infeed stations, the one or more sorting robots and the item transfer arrangement, for respective processing of the said at least one item associated with the order being processed.

17. The method as claimed in claim 10 further comprising implementing the conveyor arrangement to transfer the retrieved at least one item to one of the one or more infeed stations based on availability thereof for processing of the at least one item associated with the order being processed.

18. The method as claimed in claim 10 further comprising implementing one of the one or more sorting robots, available to receive the item thereon, to be positioned at the corresponding platform level adjacent to one of the one or more infeed stations to receive the item thereon in a distributed manner.

19. A computer program product comprising at least one non-transitory computer-readable storage medium having computer-executable program code instructions stored therein, wherein the computer-executable program code instructions comprise program code instructions to:
execute a command for an order being processed with information about one or more items associated therewith;
implement an item retrieval arrangement to retrieve, at one instance, at least one item of the one or more items associated with the order being processed and implement the conveyor arrangement to transfer the retrieved at least one item to one of one or more infeed stations in the warehouse, in response to the executed command;
implement a scanning unit provided at each of the one or more infeed stations, for scanning the items received threat to generate a scan information therefor;
assign one of storage bins of a plurality of storage bins at an item transfer arrangement to the order being processed based on the acquired scan information;
implement one of one or more sorting robots, provided on one or more platform levels with the one or more infeed stations located adjacent to one side thereof and the item transfer arrangement located adjacent to other side thereof, to collect the said at least one item from the said one of the one or more infeed stations and transfer the said at least one item to the assigned storage bin to the order being processed; and
implement the item transfer arrangement to transfer the said assigned storage bin to a packaging station in the warehouse, when each of the one or more items associated with the order being processed are transferred to the said assigned storage bin.

20. The computer program product as claimed in claim 19, wherein the computer-executable program code instructions further comprise program code instructions to:
execute the command for the order being processed based on availability of one or more of: the item retrieval arrangement, the one or more infeed stations, the one or more sorting robots and the item transfer arrangement, for respective processing of the said at least one item associated with the order being processed;
implement the conveyor arrangement to transfer the retrieved at least one item to one of the one or more infeed stations based on availability thereof for processing of the at least one item associated with the order being processed; and
implement one of the one or more sorting robots, available to receive the item thereon, to be positioned at the corresponding platform level adjacent to one of the one or more infeed stations to receive the item thereon in a distributed manner.

* * * * *